(12) United States Patent
Sun et al.

(10) Patent No.: US 7,426,350 B1
(45) Date of Patent: Sep. 16, 2008

(54) HYBRID OPTICAL AND ELECTRICAL FIBER OPTIC LINK LINEARIZER

(75) Inventors: Chen-Kuo Sun, Escondido, CA (US); Richard J. Orazi, San Diego, CA (US); Stephen A. Pappert, San Diego, CA (US)

(73) Assignee: Cisco Technology, Inc., San Jose, CA (US)

( * ) Notice: Subject to any disclaimer, the term of this patent is extended or adjusted under 35 U.S.C. 154(b) by 932 days.

(21) Appl. No.: 10/281,389

(22) Filed: Oct. 25, 2002

Related U.S. Application Data

(60) Provisional application No. 60/344,419, filed on Oct. 26, 2001.

(51) Int. Cl.
 *H04B 10/04* (2006.01)
(52) U.S. Cl. .................. 398/193; 398/159; 398/196
(58) Field of Classification Search ............ 398/158, 398/159, 193–196
 See application file for complete search history.

(56) References Cited

U.S. PATENT DOCUMENTS

| | | | |
|---|---|---|---|
| 3,794,841 A | 2/1974 | Cosentino et al. | |
| 4,809,257 A | 2/1989 | Gantenbein et al. | |
| 5,003,546 A | 3/1991 | Lidgard et al. | |
| 5,161,044 A * | 11/1992 | Nazarathy et al. | 398/194 |
| 5,229,593 A | 7/1993 | Cato | |
| 5,252,930 A | 10/1993 | Blauvelt | |
| 5,257,124 A | 10/1993 | Glaab et al. | |
| 5,282,072 A | 1/1994 | Nazarathy et al. | |
| 5,416,627 A | 5/1995 | Wilmoth | |
| 5,424,680 A | 6/1995 | Nazarathy et al. | |
| 5,436,749 A | 7/1995 | Pidgeon, Jr. et al. | |
| 5,481,389 A | 1/1996 | Pidgeon et al. | |
| 5,680,104 A | 10/1997 | Slemon et al. | |
| 5,777,768 A | 7/1998 | Korevaar | |
| 5,850,305 A * | 12/1998 | Pidgeon | 398/193 |
| 6,122,085 A | 9/2000 | Bitler | |
| 6,538,789 B2 * | 3/2003 | Sun | 398/158 |
| 6,574,389 B1 * | 6/2003 | Schemmann et al. | 385/24 |
| 6,687,466 B1 * | 2/2004 | Chiappetta | 398/193 |

OTHER PUBLICATIONS

Kuo, C.Y., et al., "Erbium-Doped Fiber Amplifier Second-Order Distortion in Analog Links and Electronic Compensation", *IEEE Photonics Technology Letters*, vol. 3, No. 9, Sep. 1991.

Kuo, C.Y., "Fundamental Second-Order Nonlinear Distortions in Analog AM CATV Transport Systems Based on Single Frequency Semiconductor Lasers", *Journal of Lightwave Technology*, vol. 10, No. 2, Feb. 1992.

Lidgard, Anne, et al., "Generation and Cancellation of Second-Order Harmonic Distortion in Analog Optical Systems by Interferometric FM-AM Conversion", *IEEE Photonics Technology Letters*, vol. 2, No. 7, Jul. 1990.

Jun Ohya et al.; *Second-Order Distortion Generated by Amplification of Intesity-Modulated Signals with Chirping in Erbium-Doped Fiber*; Sep. 1992; IEEE Photonics Technology Letters, vol. No. 9.

Jun Ohya et al.; *Cancellation of Second-Order Distortion of Directly Modulated Laser in Erbium-Doped Fiber Amplifier*; Apr. 1993; IEEE Photonics Technolgy Letters, vol. 4, No. 4.

* cited by examiner

*Primary Examiner*—Dzung Tran
(74) *Attorney, Agent, or Firm*—Fish & Richardson, PC

(57) ABSTRACT

Techniques and systems for reducing nonlinear distortions in an output optical beam from an optical transmitter by using both electrical pre-distortion compensation and optical compensation.

5 Claims, 14 Drawing Sheets

HYBRID OPTICAL AND ELECTRICAL FIBER OPTIC LINK LINEARIZER

This application claims the benefit of U.S. Provisional Application No. 60/344,419 filed Oct. 26, 2001, the entire disclosure of which is incorporated herein by reference.

BACKGROUND

This application relates to optical transmission of information by modulating a driving current to a semiconductor laser, and more particularly, to linearization techniques and devices for reducing distortions in optical signals from modulated semiconductor lasers in optical transmitters and fiber transmission systems.

Optical waves can be modulated to carry and transmit information in various optical communications applications including CATV systems. Modulation of an optical wave may be achieved by directly modulating the driving current to a semiconductor laser such as a diode laser to produce a modulated optical output. RF signals, for example, may be superimposed on the driving current and thus be carried by the modulated optical output from the laser.

Such direct modulation of semiconductor lasers, however, is known to generate nonlinear characteristics in the modulated optical signals. The nonlinear characteristics can distort the information-carrying signals and hence are undesirable. This need for high linearity in microwave optical transmission systems is well recognized. The inherent linearity of most commercial laser diodes and integrated optical modulators is insufficient for the most demanding analog transmission applications, such as CATV signal distribution. In these cases, additional fiber optic link linearization techniques must be employed to suppress nonlinear distortion introduced principally by the optical transmitter.

One approach for linearizing the microwave signals transmitted over optical fibers uses electrical pre-distortion circuits. The electrical drive signal to the optical transmitter is pre-distorted to substantially compensate or cancel the non-linearities introduced by the optical modulation process. Both the second order and third order nonlinear distortion characteristics can be improved through this process. See, e.g., U.S. Pat. No. 4,992,754 to Blauvelt et al.

Another approach uses an optical Fabry-Perot interferometric device in the optical path of the output beam of a modulated semiconductor laser to introduce optical distortions that reduce or cancel the nonlinearities in the modulated optical signal. See, e.g., U.S. Pat. No. 5,003,546 to Lidgard et al.

SUMMARY

This application includes a system which has an optical transmitter, and an electrical pre-distortion circuit. The optical transmitter is to produce an optical signal in response to a control signal that is modulated to carry information. The electrical pre-distortion circuit is coupled in an electrical path of the control signal prior to reception by the optical transmitter and is operable to superimpose an electrical pre-distortion signal to the control signal that reduces nonlinear distortions in the optical signal. The system further includes an optical device disposed in an optical path of the optical signal and is configured to produce a wavelength-dependent optical transfer profile on the optical signal to reduce residual nonlinear distortions in the optical signal and to produce a linearized optical signal.

DETAILED DESCRIPTION

This application includes linearization techniques and devices that integrate both optical linearization and electrical pre-distortion techniques. Such hybrid or dual linearization explores and combines advantages of the optical linearization and the electrical pre-distortion techniques to achieve enhanced linearization performance that would otherwise be difficult to achieve with either techniques alone. Notably, the linearization of such hybrid systems can be dynamically controlled to adjust the distortion compensation and to maintain the linearization in the optical signals in presence of various fluctuations and variations in the optical transmitters and the optical transmission paths that change the adverse nonlinear characteristics in time.

Various exemplary embodiments of the hybrid linearization systems are described and illustrated in this application. Each embodiment uses an electrical pre-distortion circuit for superimposing pre-distortion signals on the driving current that drives or controls the optical transmitter (e.g., a laser diode). Various pre-distortion circuits may be used for implementing the exemplary embodiments, including the electrical pre-distortion circuits described by Huang and Saad in "Novel Third-Order Distortion Generator with Residual IM2 Suppression Capabilities," IEEE Transactions on Microwave Theory and Techniques, Vol. 46(12), pp. 2372-2382 (December, 1998).

In addition to a pre-distortion circuit, one or more optical linearizers may also be placed in the optical path of the output optical signal from the optical transmitter, either at the transmitter side or the receiver side of a system. Such an optical linearizer is an external optical component that possesses wavelength dependent transfer characteristics. By matching the optical transmitter wavelength properties with the correct external component operating point, significant reduction or cancellation of the nonlinear microwave signal distortion may be achieved. When operated alone, a properly-designed optical linearizer may substantially reduce both second and third order nonlinearities in the output signal generated by the laser diode transmitter.

In general, various optical devices may be used to form an optical linearizer. Examples include optical linearizers and the associated fiber systems disclosed by C. K. Sun in "Optical Linearizer for Fiber Communications," U.S. patent application Ser. No. 09/825,631, filed Apr. 3, 2001. Various embodiments of optical linearizers will also be described at later sections of this application.

Figure 1:
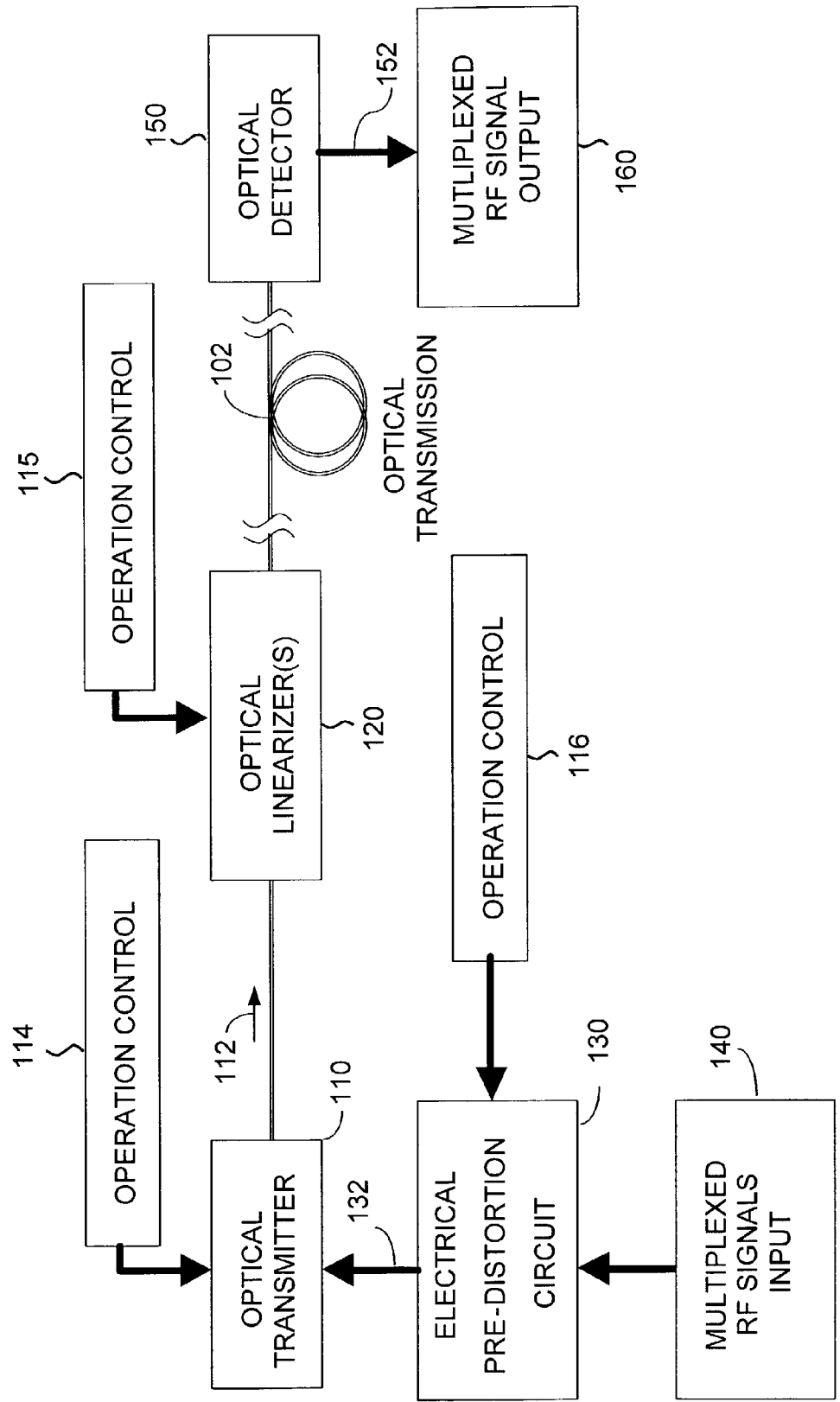
FIG. 1 shows one embodiment of an optical communication system to illustrate basic features of a hybrid electrical and optical linearization mechanism.

FIG. 1 illustrates an optical communication system 100 of the hybrid electrical and optical linearization approach according to one embodiment. The optical transmitter 110, such as a current-modulated laser diode, is used to generate a laser beam 112 for optical transmission through an optical link, such as a fiber link or network. The laser beam 112 may be modulated in a particular manner to carry information. Multiplexed RF signals 140 are input to the optical transmitter 110 to modulate the laser beam 112, e.g., by modulating the driving current in the optical transmitter 110. This direct modulation of the optical transmitter 110 may cause adverse nonlinear distortions in the information-carrying signal embedded in the laser beam 112. The system 100 includes an electrical pre-distortion circuit 130 to modify the RF signals 140 by introducing specific amounts of nonlinear distortions to the signals 140 to produce a composite signal 132 for modulating the optical transmitter 110. The introduced nonlinear distortions may include, for example, either or both of the second-order and third-order signal distortions to negate or substantially reduce the nonlinear distortions in the laser beam 112 generated by the optical transmitter 110. The optical domain laser output signal 112 has improved distortion characteristics by virtue of this electronic pre-distortion alone.

Notably, the system 100 also incorporates an optical linearizer 120 in the optical path of the laser beam 112 to optically add desired distortions on the laser beam 112 to negate the remaining distortions that are not compensated for by the electrical pre-distortion circuit 130. The laser signal 112 is directed to pass through the external optical linearizer 120 to achieve this optical compensation for signal distortions. The optical linearizer 120 may be implemented in various configurations, such as a fused fiber coupler with wavelength dependent transfer characteristics and other exemplary implementations described in this application. By selecting the operating point of the wavelength dependent optical component transfer curve of the optical linearizer 120, further cancellation of the laser nonlinear distortion can be achieved. More than one optical linearization component may be cascaded as part of the optical linearizer 120. Such linearization components may be configured to have different optical transfer curves so that the combined effects of such components in the linearizer 120 produce desired linearization properties in the laser signal 112 after such optical processing.

As illustrated in FIG. 1, the laser signal 112 output by the optical linearizer 120 may be directed through an optical transmission link 102 such as a distance of optical fiber. An optical detector 150 may be optically coupled to receive a portion of or the entirety of the transmitted laser signal 112. The electrical output 152 of the optical detector includes a replica of the multiplexed RF input signals 140 whose distortion is significantly reduced by the operation of the circuit 130 and the optical linearizer 120. The optimum operating conditions of the optical transmitter 110, electrical pre-distortion circuit 130 and the optical linearizer 120 may in general be regulated by separate operation controllers 114, 116 and 115, respectively. In practice, such operation controls may be implemented in a more integrated and unified fashion, where two or all three controllers may be combined into a single control unit.

Both open and closed loop linearizer operations can be used to minimize the signal distortions. In the open loop linearizer operation, a dynamic feedback loop is not used and each of the pre-distortion circuit 130 and the optical linearizer 120 may be adjusted to optimize the net linearization effect. For example, the laser diode and optical linearizer set points in terms of temperature (wavelength) and laser bias current (optical power), and the electronic pre-distortion circuit parameters are initially adjusted and fixed to minimize distortion. In the close loop linearizer operation, a signal detector, such as the detector 150, and a dynamic feedback loop that responds to the output of the detector, may be used to control either or both of the pre-distortion circuit 130 and the optical linearizer 120 in real time.

The sequence of optimizing the electronic pre-distortion and optical linearization processes can be important in certain applications. In general, either the electrical or the optical linearization may be carried out first. When the electrical linearization is performed first with a composite microwave signal modulating the drive current to a laser diode in the optical transmitter 110, the electrical pre-distortion circuit 130 may be tuned to reduce either or both of the second and third order nonlinearities introduced by modulating the laser diode. This may be achieved by applying a control signal such as a voltage or current to a nonlinear electronic circuit which generates either or both of a second-order distortion signal and a third-order distortion signal of specified amplitude and phase. The transmitted microwave signal itself may be monitored to perform this tuning or the adjustment on the voltage or current. In this case, the laser diode operating point is fixed resulting in certain second and third order distortion properties that can be minimized by proper choice of the electronic circuit parameters. The optical domain signal 112 with already reduced nonlinearity is then transmitted through the external optical component in the optical linearizer 120 for further reduction in the nonlinear distortions. The transmission operating point of the external optical component can be aligned with the operating point of the laser diode to generate a compensating second- and/or third-order signal with desired amplitude and phase. This allows for further reduction in the nonlinear transmission characteristics to be achieved. A typical scenario would be a third-order electronic pre-distortion circuit is used to minimize the CTB and a second-order optical linearizer used to minimize the CSO. In practice, the laser diode operating current and temperature or the operating point associated with the linearizing optical component might be adjusted to achieve optimal optical linearization. In open loop operation, the transmitted microwave signal can be used to make the appropriate adjustments. Once optimal optical linearization has been achieved, the electrical circuit parameters of the pre-distortion circuit might need slight readjustment to account for minor laser diode operating point dependent distortion.

When the optical linearization is carried out first in an open loop system, the transmission operating point of the external optical component in the optical linearizer 120 may be aligned with the operating point of the laser diode in the transmitter 110 to reduce the nonlinear transmission characteristics. This operation may be achieved with the electronic pre-distortion circuit 130 turned off and using the same laser diode and optical component parameter adjustments mentioned above. The electrical pre-distortion circuit can then be turned on and tuned to further reduce either or both of the second and the third order nonlinearities introduced by the laser diode. Understanding that the optical linearization process is in general, a more broadband linearization approach, there are advantages to performing optical linearization adjustments first. However, this is not required in each hybrid linearization system. In general, the combination and implementation of these two linearization approaches are compatible and highly independent.

This hybrid or dual electrical and optical linearization approach for improving the linearization of optically transmitted microwave signals may be used in such a way that the electrical linearization might improve either second or third order nonlinear distortion only, while the optical linearization optimized to improve the other distortion component. In another configuration under this approach, both the electrical and optical linearization process may be used to improve both the second and third order optical transmitter nonlinearity. Flexibility exists with this approach in allowing both the electrical and optical domain linearization to be tailored and optimized independently and on a case by case basis. This process is valuable in allowing for inferior laser diodes with respect to linearity to be substantially improved. The linearity improvements that can be obtained with this hybrid technique generally exceed the improvements of each of these techniques used separately. One virtue of this hybrid technique is that the optical linearization can be done not only at the transmitter site, but at the optical detector site as well. This allows for the possibility of correcting for any fiber induced nonlinearities incurred during the long fiber transmission. In this special case as well as for some other topologies, active control to maintain minimum distortion levels might be desired.

An open loop implementation of the hybrid linearization system may not be sufficient in certain application where the distortions may vary over time. Hence, a closed loop operation control of the dual linearization might be desirable to correct such variations in the distortions in real time. The active control and minimization of the nonlinear distortion using this combination approach can be achieved in a variety of ways. For example, either or both the electrical and optical domain linearization can be operated and controlled in a closed loop control.

Figure 2:
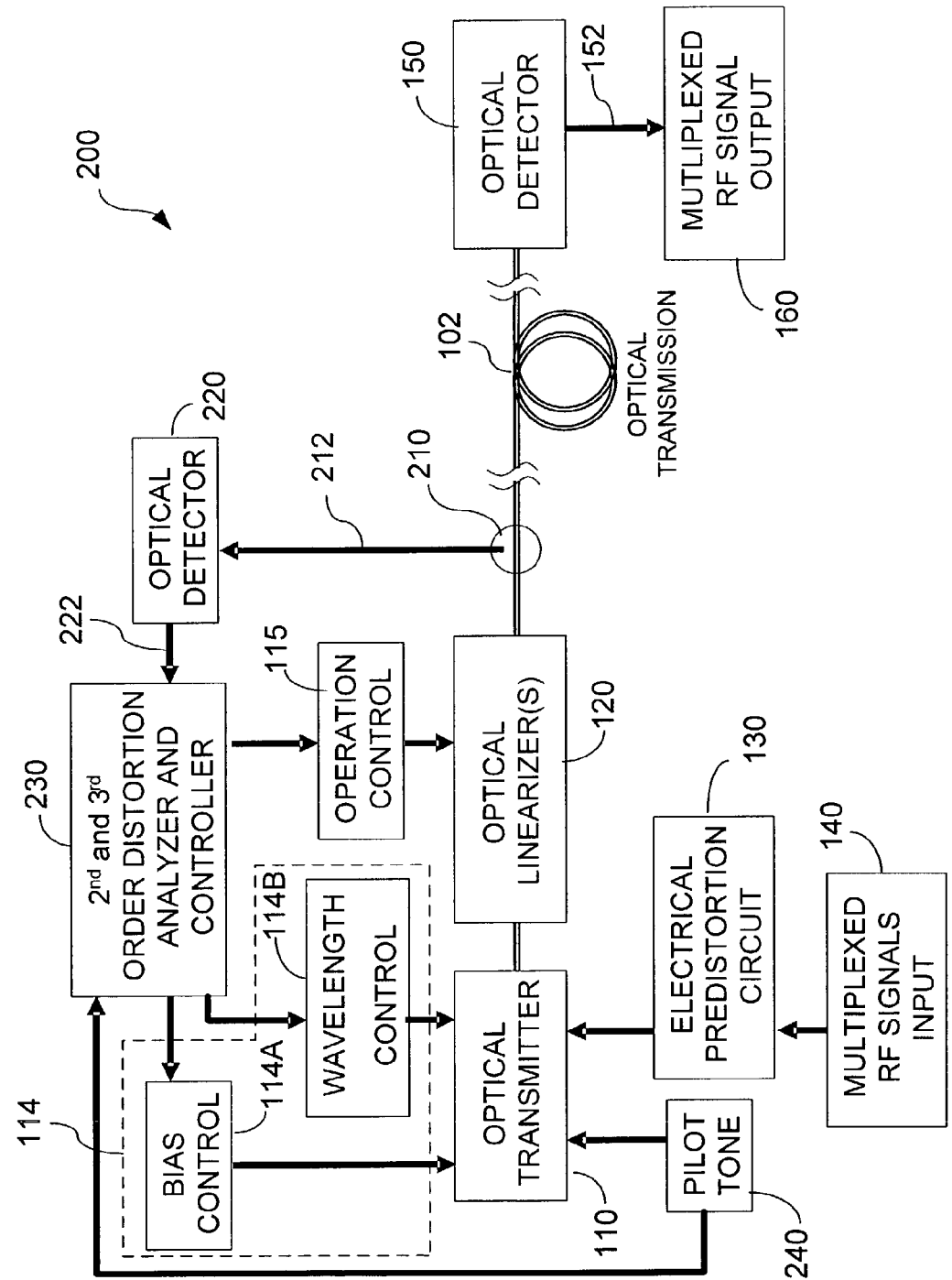
FIGS. 2 through 10 illustrate various embodiments of the hybrid electrical and optical linearization mechanism in optical communication systems.

FIG. 2 shows an optical communication system 200 based on the hybrid linearization design, where the optical domain linearization is actively controlled by a feedback loop. A small portion 212 of the optical signal 112 after the optical processing by the optical linearizer 120 is tapped off by an optical beam splitter or coupler 210 and is detected by an optical detector 220 for the feedback loop. The electrical signal 222 generated by the detector 220 is fed into a distortion analyzer and controller 230. The analyzer 230 detects distortion levels of the injected pilot tone from a pilot tone generator 340 and provides feedback to actively maintain minimum distortion levels. Although a dedicated pilot tone is shown for simplicity, in many cases the microwave signal to be transmitted can be used to analyze the nonlinear distortion levels and determine the feedback signal so that a pilot tone is not needed. As shown in FIG. 2, the laser control 114 includes a bias control 114A and a wavelength control 114B in this implementation. The laser wavelength, e.g., through a temperature control on the laser diode, and the bias point of the optical transmitter 110, are controlled through this active feedback process to minimize or negate the transmitter distortion. In addition, the operating point of the linearizing optical component in the optical linearizer 120 is shown to be actively controlled by the analyzer 230 to provide fine adjustment to the optical linearizer 120.

Figure 3:
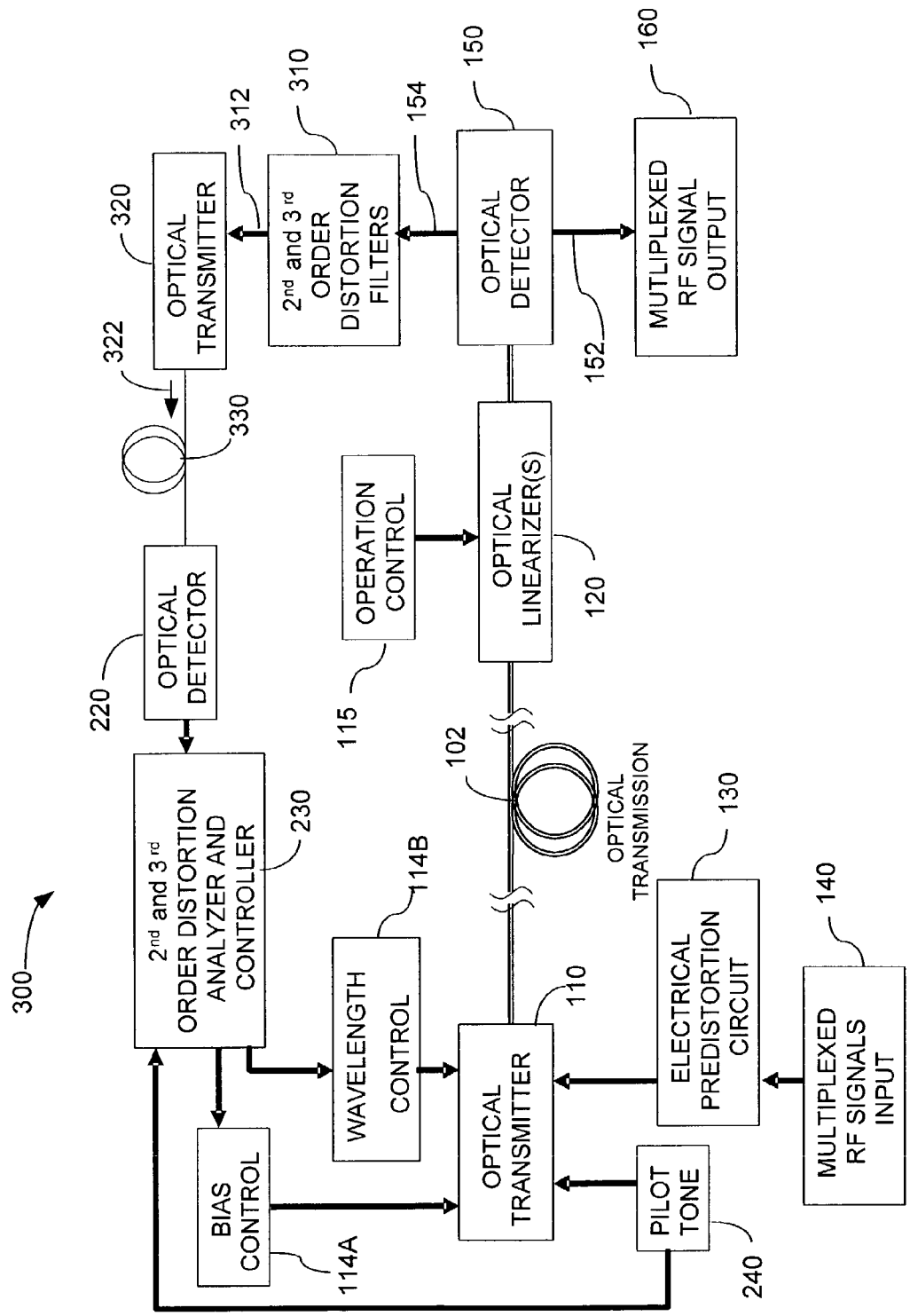

FIG. 3 shows an optical communication system 300 where the optical linearizer is co-located with the optical detector 150 at the signal receiving end and the control feedback is provided through an optical link 330 back to the optical transmitter 110 on the signal transmitting side. The optical detector 150 processes the received signal to extract the multiplexed RF signals 160 as output and generate another output signal 154. One or more distortion filters 310 are used to receive and process the output signal 154 to produce an electronic signal 312 containing information on the signal distortions in the received signal by the optical detector 150. A feedback optical transmitter 320, which may include a laser diode, produces a feedback laser signal 322 that is modulated to include the distortion information in response to a laser control signal based on the signal 312. After transmitting through the fiber feedback loop 322, the feedback laser signal 322 is received by the optical detector 220. The distortion analyzer 230 receives the output from the detector 220 and causes the optical transmitter 110 to be controlled to reduce the distortions received by the optical detector 150. Here, the laser diode in the optical transmitter 110 may be principally adjusted through bias current and the diode temperature to achieve distortion suppression.

Figure 4:
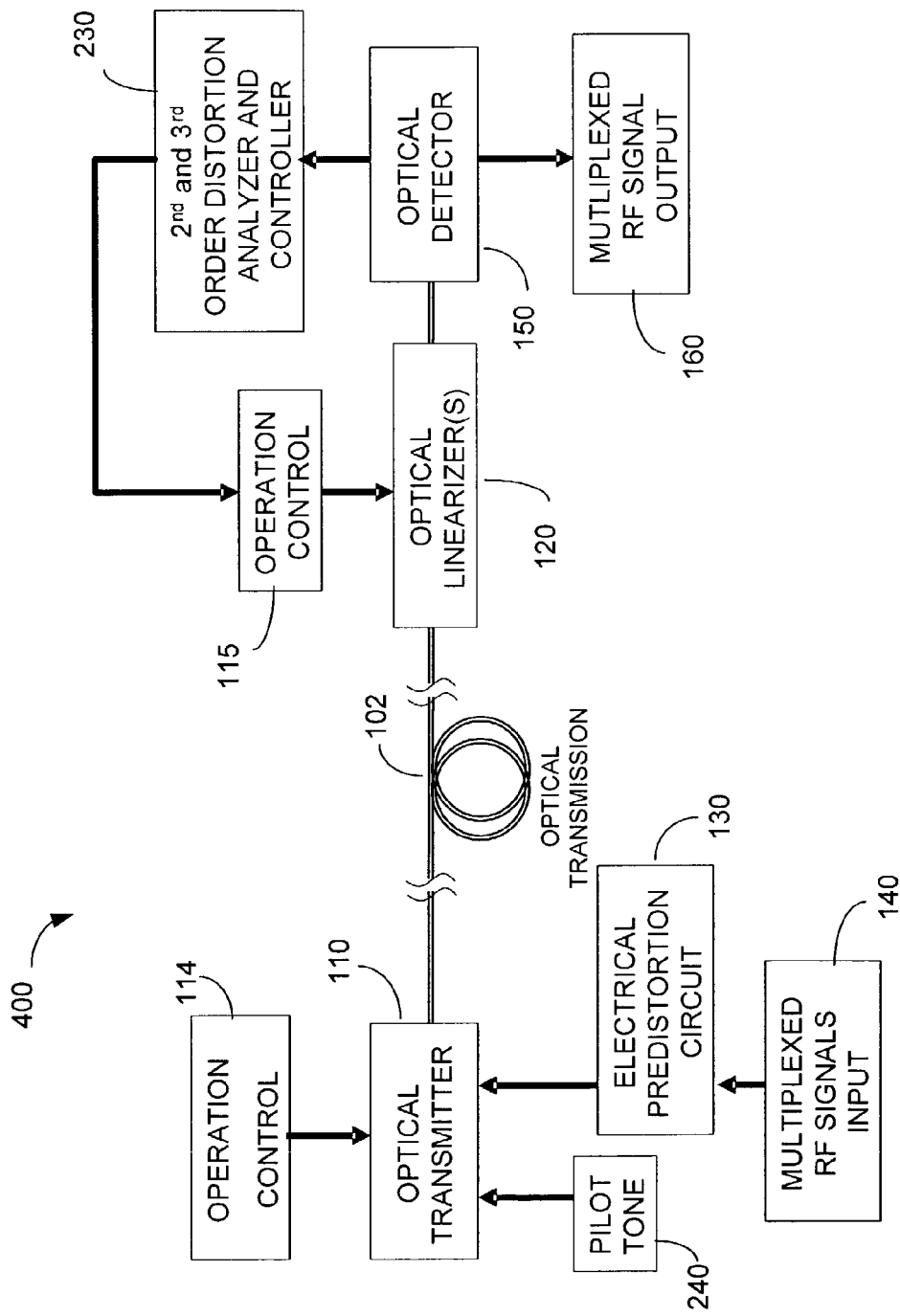

FIG. 4 shows another embodiment 400 where the optical linearizer 120 is co-located with the optical detector 150 on the receiving end, where the feedback control is principally provided to the optical linearizer 120 where its operating parameters are altered to minimize the link distortion. In this case, the laser diode operating conditions are fixed and distortion suppression is principally achieved through feedback control to the optical component in the optical linearizer 120.

Figure 5:
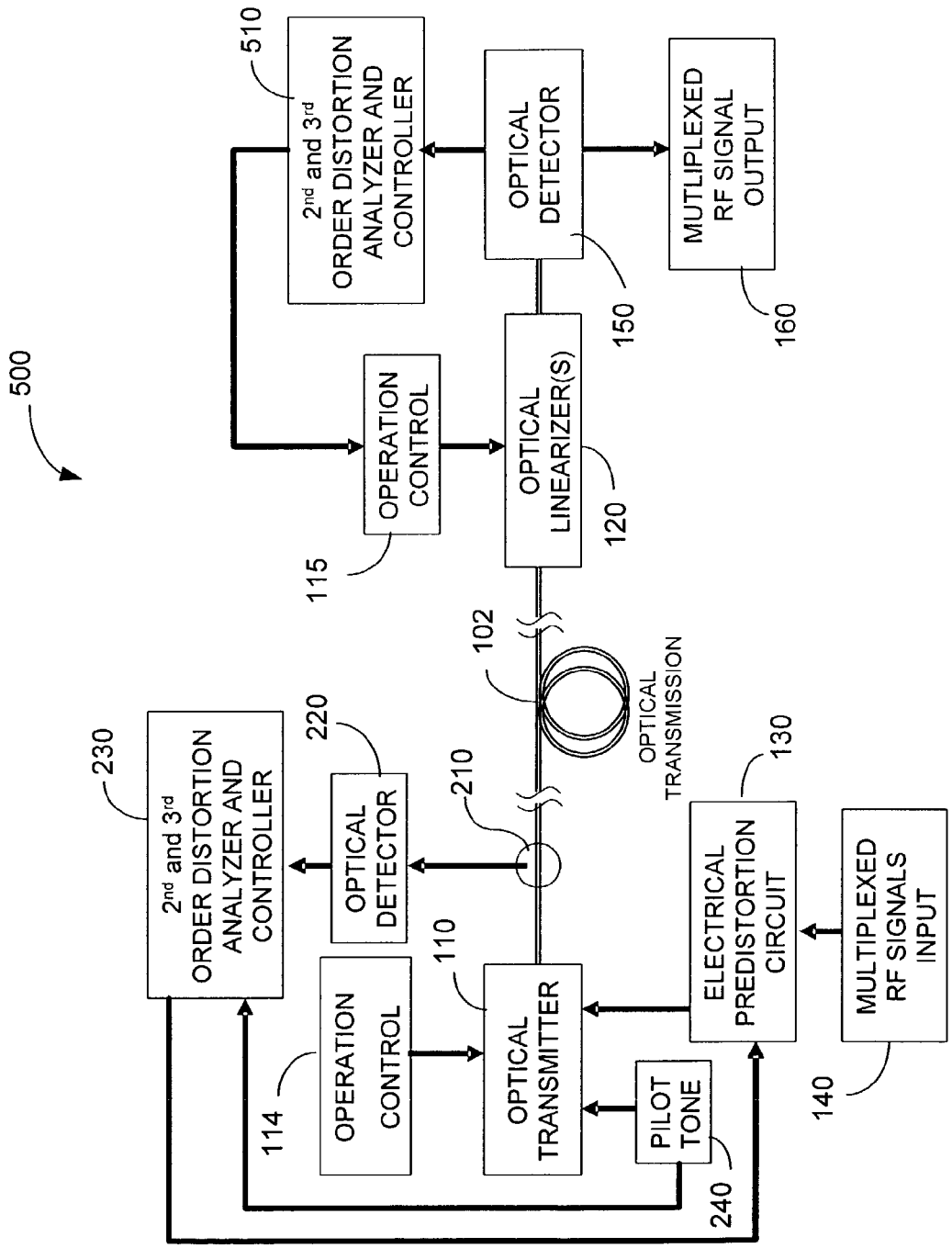

In addition to the above exemplary system implementations, the active feedback from a distortion analyzer, e.g., the 2nd and 3rd order distortion analyzer and controller, may be applied to each of the electrical pre-distortion circuit 130 and the optical linearizer 120 to maintain minimum transmission distortion conditions. FIG. 5 shows one embodiment of a system 500 where two separate feedback loops are applied to control the electrical pre-distortion circuit 130 and the optical linearizer 120. In the illustrated example, the optical linearizer 120 is located on the receiving end with the optical detector 150. Hence, a separate distortion analyzer and controller 510 is coupled to the optical detector 150 to provide a feedback control to the control 115 of the optical linearizer 120. For the electronic pre-distortion circuit 130, the distortion analyzer and controller 230 is shown to control the operation of electronic pre-distortion circuit 130 based on the signal distortions in the signal prior to transmission through the link 102. The optical tap for monitoring the harmonic content of the applied pilot tone can be placed before the optical linearizer. In this case, the feedback signal reflects only electrical domain linearization characteristics. A separate feedback path can be applied after the optical linearizer to optimize the optical domain linearization process. Hence, the active feedback is used for both the electrical and optical domain linearization.

In the above dual electrical and optical link linearization approach, the independence of the two linearization mechanisms is shown as examples and flexibility in its implementation and should allow for higher performance microwave optical transmission systems to be realized. The above hybrid linearization techniques may also be used in systems where an optical modulator is used to modulate the beam to imprint information on the modulated beam. Here, the pre-distortion circuit is used to control the modulator and the optical linearizer is in the optical path of the modulated beam.

FIGS. 6-10 show additional exemplary implementations and embodiments of hybrid linearization systems that combine both electrical pre-distortion linearization and optical linearization.

A number of additional modes of operation or permutations of the hybrid link linearizer are possible. In one operation mode, for example, the electrical pre-distortion circuit may be used to partially correct either one or both of the second- and third-order laser induced distortions; accordingly, the optical linearizer may be used to improve upon this partial correction. Alternatively, the electrical pre-distorter may be used to fully correct the second- (third-) order laser distortion while the optical linearizer is complimentary used to fully correct the third- (second-) order distortion. Examples of these two cases are experimentally demonstrated below. One fiber optic link, for example, may include an electrical pre-distorter to correct for the laser diode induced third-order distortion while the optical linearizer is independently used to correct for the laser induced second-order distortion. As another example, the fiber optic link may include an electrical pre-distorter which partially corrects for the laser second-order laser distortion and the optical linearizer can operate to improve upon this partial distortion suppression.

Figure 6:
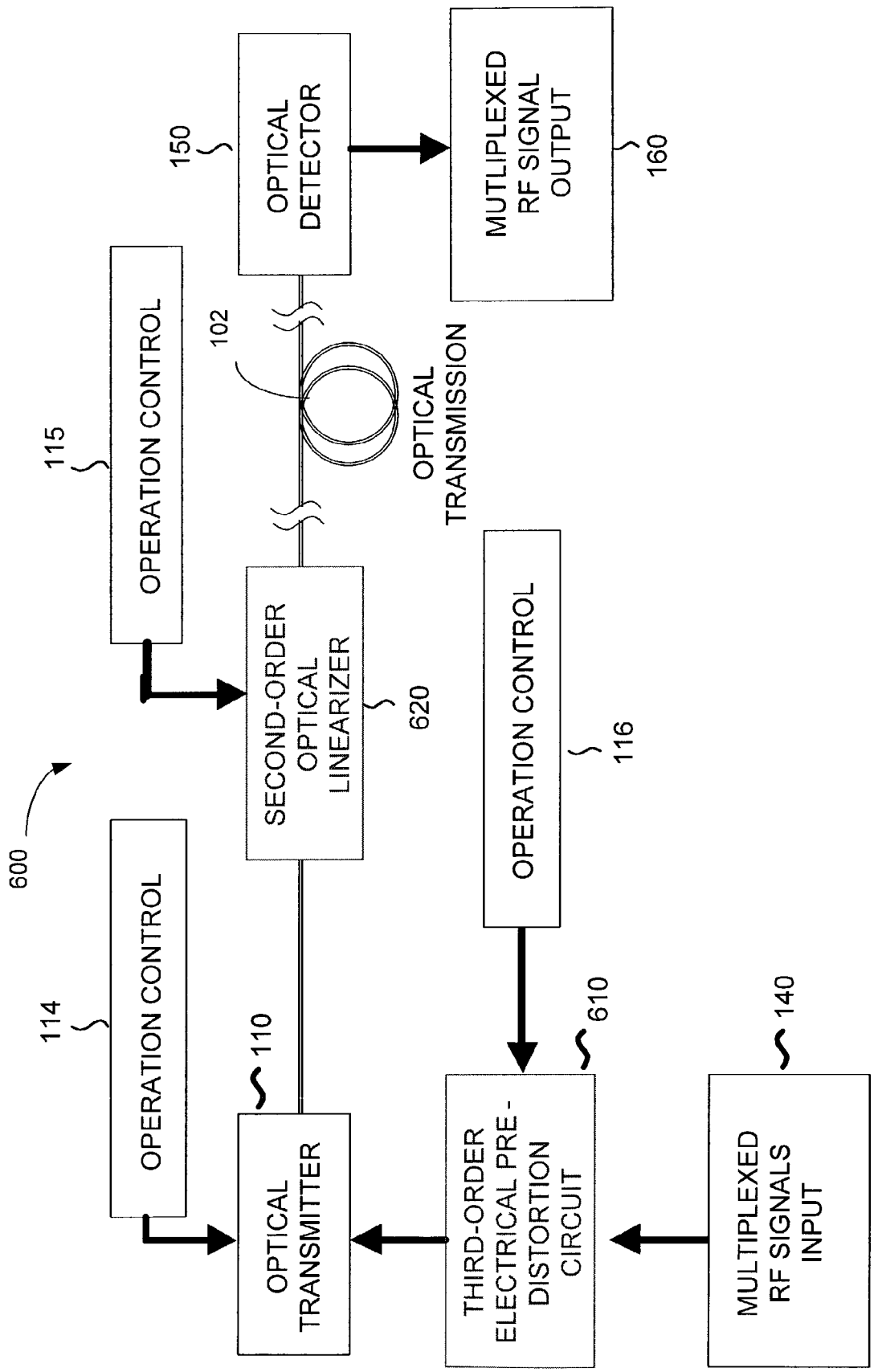

FIG. 6 shows a hybrid system 600 with electrical compensation for third-order laser distortion by using a pre-distortion circuit 610 and optical compensation for second-order laser distortion by using a second-order optical linearizer 620. This arrangement is a more specific arrangement as that shown in FIG. 1. Any suitable third-order electrical pre-distorter may be used in this embodiment, such as a circuit similar to that described by Huang and Saad in "Novel Third-Order Distortion Generator with Residual IM2 Suppression Capabilities," IEEE Transactions on Microwave Theory and Techniques, Vol. 46(12), pp. 2372-2382 (December, 1998). The second-order optical linearizer 620 may include a wavelength dependent fused fiber coupler that has been tailored for operation around 1310 nm, similar to that described by C. K. Sun in "Optical Linearizer for Fiber Communications," U.S. patent application Ser. No. 09/825,631, filed Apr. 3, 2001.

For this measurement, a CATV grade starting laser diode at 1310 nm may be used as the optical transmitter 110 which is biased at high DC current and RF modulated by a composite 78 channel NTSC CATV signal. The modulated optical signal was transmitted through 20 km of standard single-mode fiber, detected by a high linearity optical receiver, and analyzed using a CATV signal analyzer. The Carrier-to-Noise Ratio (CNR), the Composite Second Order (CSO) and Composite Triple Beat (CTB) distortion are measured yielding the link linearity performance. For reference, performance levels are measured with 0 dBm received optical power.

Table 1 shows the link performance with no electrical or optical linearization, displaying poor CSO and CTB performance (CSO and CTB values lower than −65 dBc at high CNR (>52 dB) are typically required for CATV signal distribution applications).

Table 2 shows the link performance with combined electrical third-order compensation and optical second order compensation. Simple open loop control and adjustment of the electrical pre-distortion circuit, the optical linearizer and the optical transmitter have been used for this measurement. The details of open and closed loop operation for distortion minimization are discussed below. Significant improvement in the laser distortion properties are obtained using this hybrid linearization approach, approximately 10 dB third-order improvement and >20 dB second-order improvement, displaying the utility of this combined approach.

TABLE 1

Measured fiber optic link performance for NTSC 78 channel CATV loading with 0 dBm received power with no electrical or optical linearization

| Freq (MHz) | CNR (dB) | CSO (dBc) | CTB (dBc) |
|---|---|---|---|
| 55.25 | 54.6 | −45.6 | −58.5 |
| 343.25 | 53.5 | −48.5 | −59.0 |
| 547.25 | 54.1 | −47.2 | −60.5 |

TABLE 2

Measured fiber optic link performance for NTSC 78 channel CATV loading with 0 dBm received power with electrical third-order laser distortion compensation and optical second-order laser distortion compensation

| Freq (MHz) | CNR (dB) | CSO (dBc) | CTB (dBc) |
|---|---|---|---|
| 55.25 | 54.7 | −73.7 | −73.4 |
| 343.25 | 53.5 | −70.7 | −70.9 |
| 547.25 | 53.4 | −68.7 | −69.9 |

Figure 7:
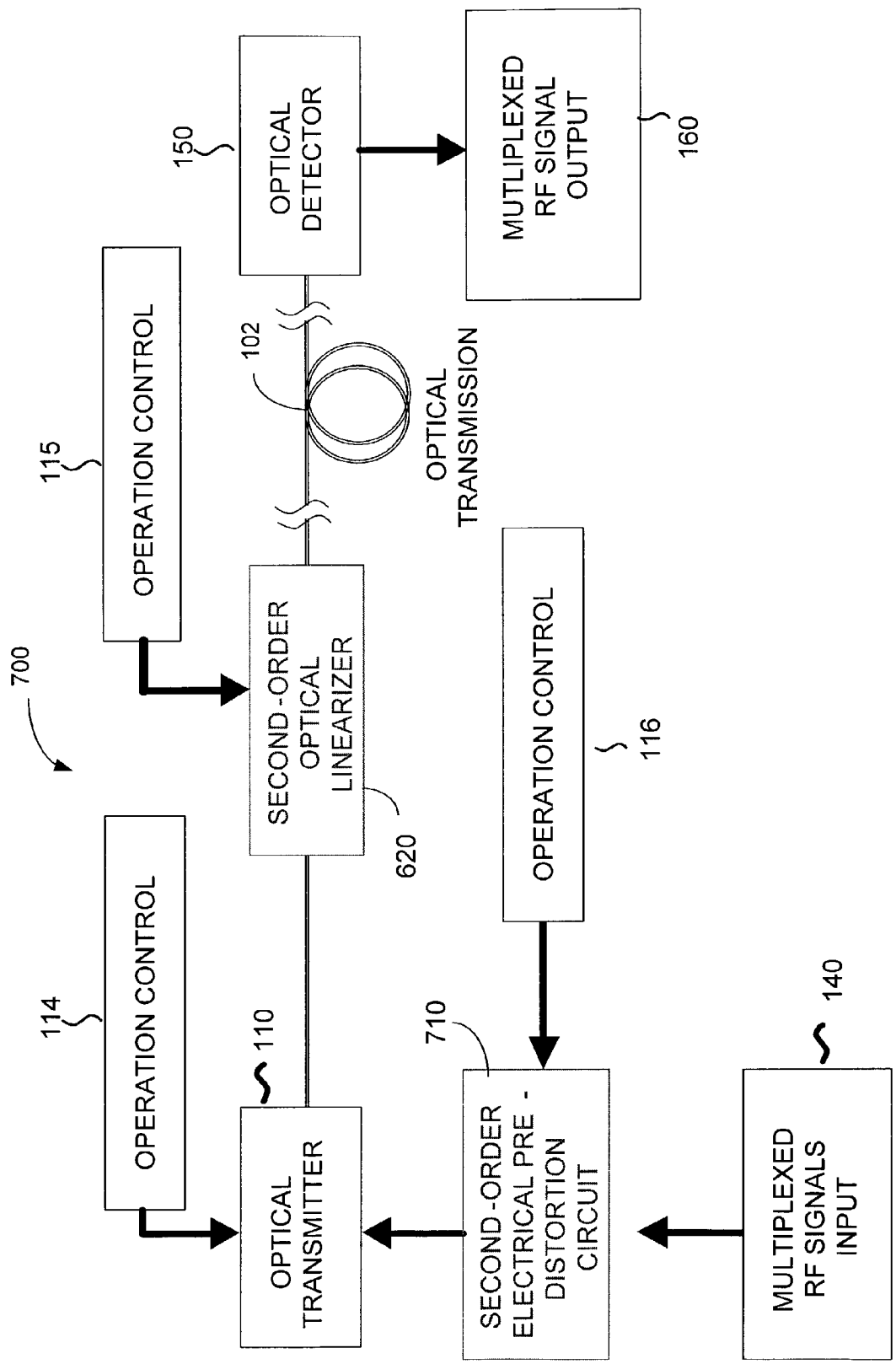

FIG. 7 shows the link arrangement 700 for electrically and optically compensating for second-order laser distortion. A second-order electrical pre-distortion circuit 710 is used for the optical transmitter 110. For simplicity, complimentary third-order correction is not shown. This arrangement is useful for cases where either optical or electrical compensation alone is not sufficient, and combined operation results in improved linearity. Most of the same fiber optic link and linearizer components and conditions as that described above have been used. The major difference is that an electrical second-order pre-distortion circuit 710 has been employed. This system 700 has an open loop linearization scheme which includes the electrical pre-distortion circuit 710, the optical linearizer 620, and the optical transmitter 110.

Table 3 shows the CNR and CSO link performance with no electrical or optical linearization displaying poor second-order distortion performance. Also included in Table 3 is the link performance with electrical, optical and combined electrical/optical second-order compensation. Significant improvement (>3 dB) in the link linearity performance is obtained using this combined hybrid linearization approach, displaying its utility overcoming transmitter distortion related limitations.

TABLE 3

Measured fiber optic link performance for NTSC 78 channel CATV loading with 0 dBm received power with no linearization, electrical linearization, optical linearization and combined optical-electrical second-order link linearization

| Freq (MHz) | CNR (dB) | CSO (dBc) | |
|---|---|---|---|
| | | No electrical and optical linearization | |
| 55.25 | 52.37 | −46.3 | CSO in −47 dB range (−65 dB required) |
| 343.25 | 52.0 | −51.2 | |
| 547.25 | 51.4 | −48.7 | |
| | | Electrical linearization | |
| 55.25 | 53.0 | −63.6 | 8 dB worse case CSO improvement |
| 343.25 | 52.0 | −59.0 | |
| 547.25 | 51.6 | −66.5 | |
| | | Optical linearization | |
| 55.25 | 53.1 | −68.6 | 15 dB worse case CSO improvement |
| 343.25 | 52.7 | −66.6 | |
| 547.25 | 52.2 | −64.2 | |
| | | Electrical & optical second order linearization | |
| 55.25 | 53.5 | −66.8 | 18 dB worse case CSO improvement |
| 343.25 | 52.7 | −69.8 | |
| 547.25 | 51.9 | −69.6 | |

Figure 8:
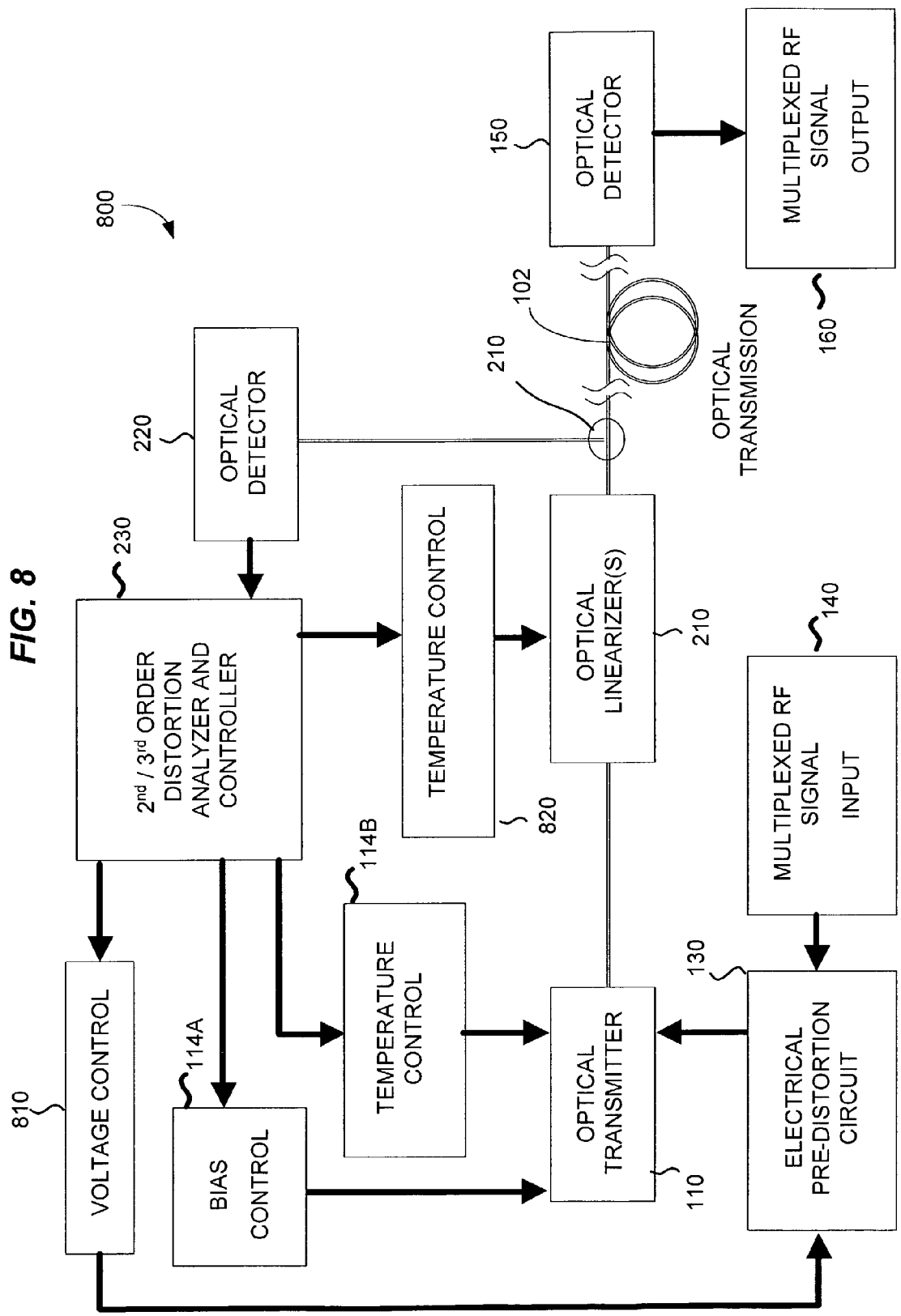

The two demonstration examples discussed above can be implemented using either open or closed loop operation. FIG. 8 shows a system embodiment where the electrical and optical domain linearization are actively controlled. A small portion of the optical signal is tapped off at the optical coupler 210 within or after the optical linearizer 120 and is detected by the detector 220. The resulting electrical signal is fed into a distortion analyzer and controller 230. The analyzer 230, in this and other implementations, may include a microcontroller in its simplest form, to a more complex microcontroller with integrated RF filter and power meter. The analyzer 230 either directly or indirectly detects distortion levels by monitoring the optical power or electrical RF power level of the injected composite RF signal 140 providing feedback to actively maintain minimum distortion levels. In some cases, it might be advantageous to inject an RF pilot tone in addition to the multiplexed RF signal 140 to be used to analyze the nonlinear distortion levels and determine the feedback signal. The laser wavelength, through temperature control 114B for the laser diode, for example, and the bias point of the optical transmitter 110, through temperature control 820 for the linearizer 120, for example, can be controlled through this active feedback process to minimize the transmitter distortions. In addition, the operating point of the electrical pre-distortion circuit 130 can be actively controlled through its voltage or current controller 810 which is coupled between the devices 230 and 130. Using this approach, active monitoring can be applied to either or both optical domain linearization or electrical domain linearization. In practice, closed loop operation for the optical linearization and open loop operation for the electrical linearization is preferred.

Figure 9:
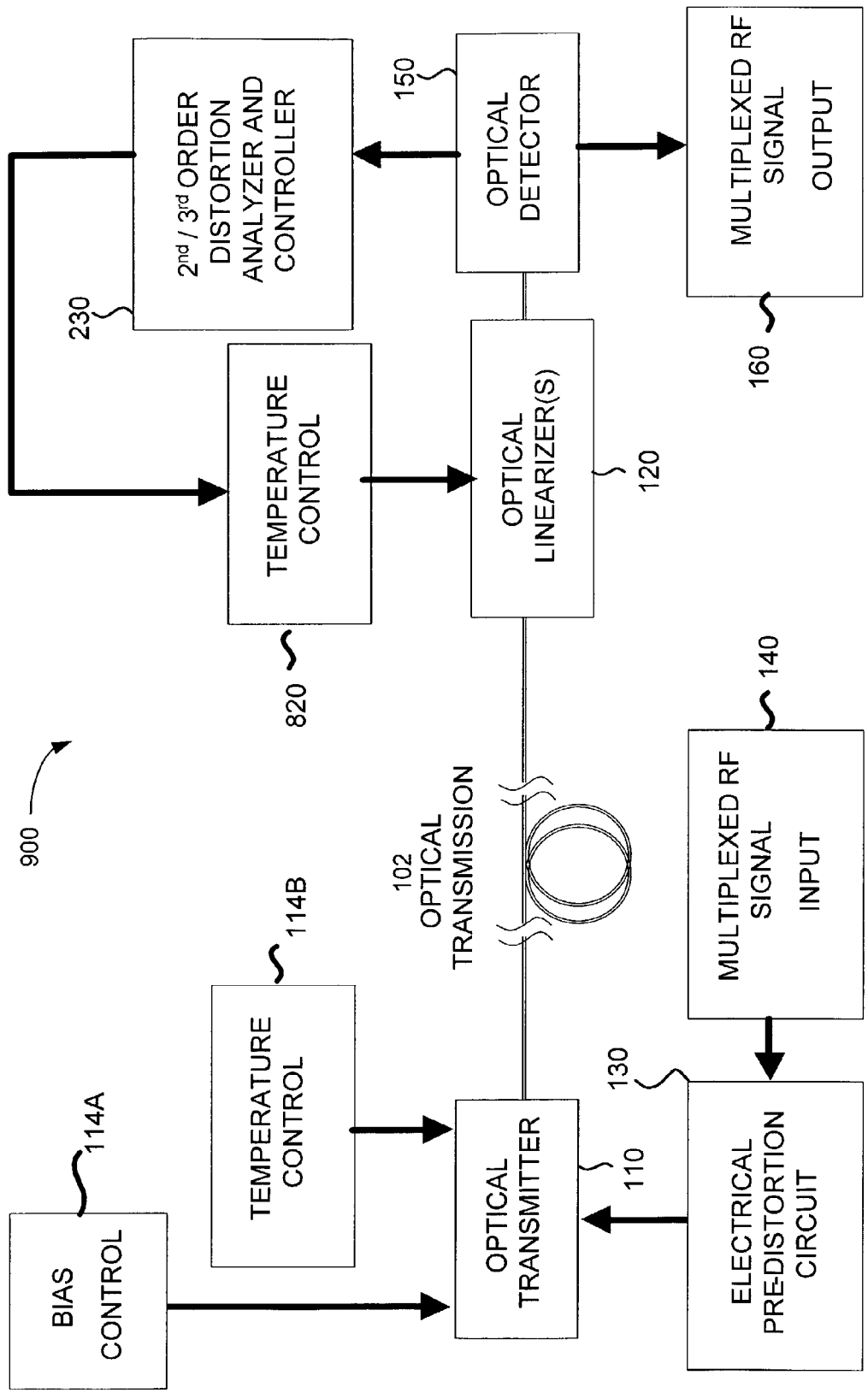

FIG. 9 shows an embodiment 900 where the optical linearizer 120 is co-located with the optical detector 150. This is a variation of the embodiment shown in FIG. 4. In this embodiment, the feedback is provided through the distortion analyzer 230 and temperature controller 820 to the optical linearizer 120 where its operating parameters are altered to minimize the link distortion. The operating conditions of the laser diode in the transmitter 110 and the electronic pre-distortion circuit 130 are fixed (open loop operation) and distortion suppression is principally achieved through feedback control (closed loop operation) to the optical linearizer 120.

Figure 10:
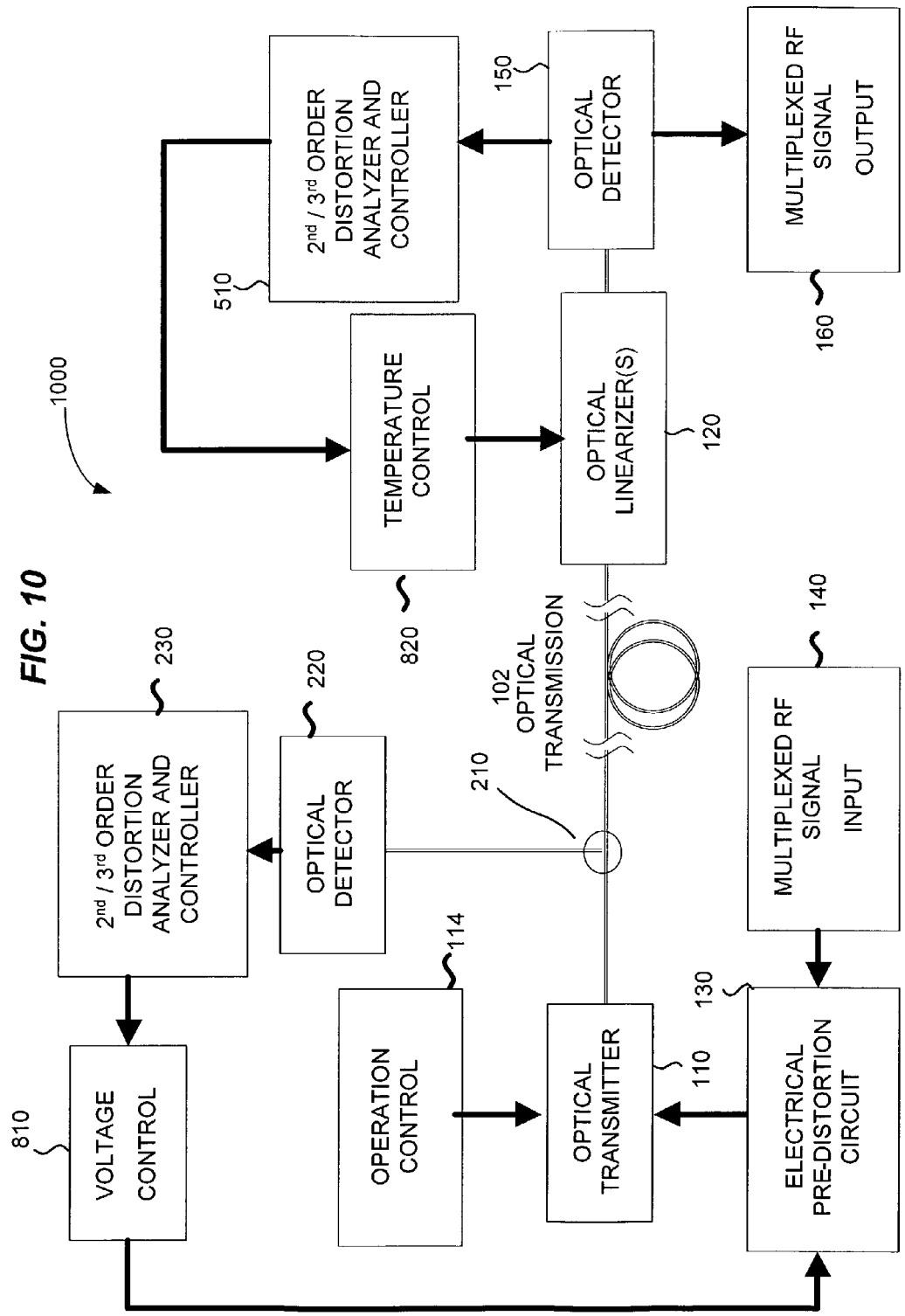

FIG. 10 further shows that a system 1000 alternative to the embodiment shown in FIG. 5, where closed-loop active feedback mechanisms for both electrical and optical linearization can be achieved by placing the optical linearizer 120 at the remote optical detector 150. The electrical feedback control loop for the pre-distortion circuit 130 does not use the pilot tone generator as in FIG. 5. The control 820 for the optical linearizer 120 is a temperature control device to change the temperature of the optical element inside of the linearizer 120. In this case, the front-end feedback signal reflects only transmitter linearization characteristics while the receiver based analyzer and controller 430 reflects overall link distortion properties.

The optical linearizer 120 used in the above-described systems may be implemented in various configurations. In accordance with the present invention, a communications apparatus for linearizing the output of an optical transmitter (such as DFB laser diode), includes an optical device (such as a fused fiber WDM coupler). Specifically, the optical device is connected to receive the output of the optical transmitter. It happens that the output from the optical transmitter will include a modulated signal, as well as second and third order distortions (hereinafter sometimes collectively referred to as a "transmitter distortion"). Importantly, the transmitter output also includes a characteristic wavelength "chirping". In accordance with the present invention, this "chirping," together with the desired transmitter output, is used as an input by the optical device, to optically generate nonlinear distortion signals (hereinafter sometimes collectively referred to as "compensation distortions") that will compensate the transmitter distortion. Accordingly, the compensation distortions can be added to the output of the optical transmitter to cancel the transmitter distortions (second and/or third order distortions) in the output.

Technically, the modulated signal that is transmitted by the transmitter (e.g. laser diode) will have a center emission wavelength ($\lambda_c$) and a characteristic wavelength chirping ($d\lambda_c$). Further, the optical device (e.g. coupler) will include components for establishing a predetermined, wavelength dependent, normalized optical transfer curve $F(\lambda)$. Specifically, this optical transfer curve $F(\lambda)$ is fabricated to accommodate the operating condition of the optical transmitter. In particular, the optical transfer curve $F(\lambda)$ of the optical device is designed to have a reference wavelength ($\lambda_p$), a slope determinant wavelength spacing ($\Delta\lambda_w$), and an operating point wavelength offset ($\Delta\lambda_b$) that are all based on the known operating conditions of the transmitter.

In their connection with each other, the optical device and the optical transmitter can be individually or collectively wavelength (e.g. temperature) tuned. Preferably, an operating temperature for the optical-transmitter (or optical device) can be established which will align ($\lambda_c$) of the transmitter with ($\lambda_p + \Delta\lambda_b$) of the optical device. Regardless how the operating temperature is established, when the system is tuned, an operating point can be established on the optical transfer curve $F(\lambda)$ that will interact with the wavelength chirping ($d\lambda_c$) from the transmitter in a specified manner. Preferably, this operating point is established on the optical transfer curve $F(\lambda)$ where $\lambda_p + \Delta\lambda_b = \lambda_c$. Thus, the purpose here is to use $F(\lambda)$ to optically induce a compensation distortion from the wavelength chirping ($d\lambda_c$) that will substantially compensate the transmitter distortions (second and/or third order distortions) that are introduced by the transmitter. Once the compensation distortions have been induced by the optical device (e.g. coupler), linearization of the optical transmitter (e.g. laser diode) is accomplished by adding the compensation distortion to the output of the transmitter. Stated differently, the compensation distortion is added to the output of the optical transmitter to cancel the transmitter distortion from the modulated signal in the output.

Figure 11:
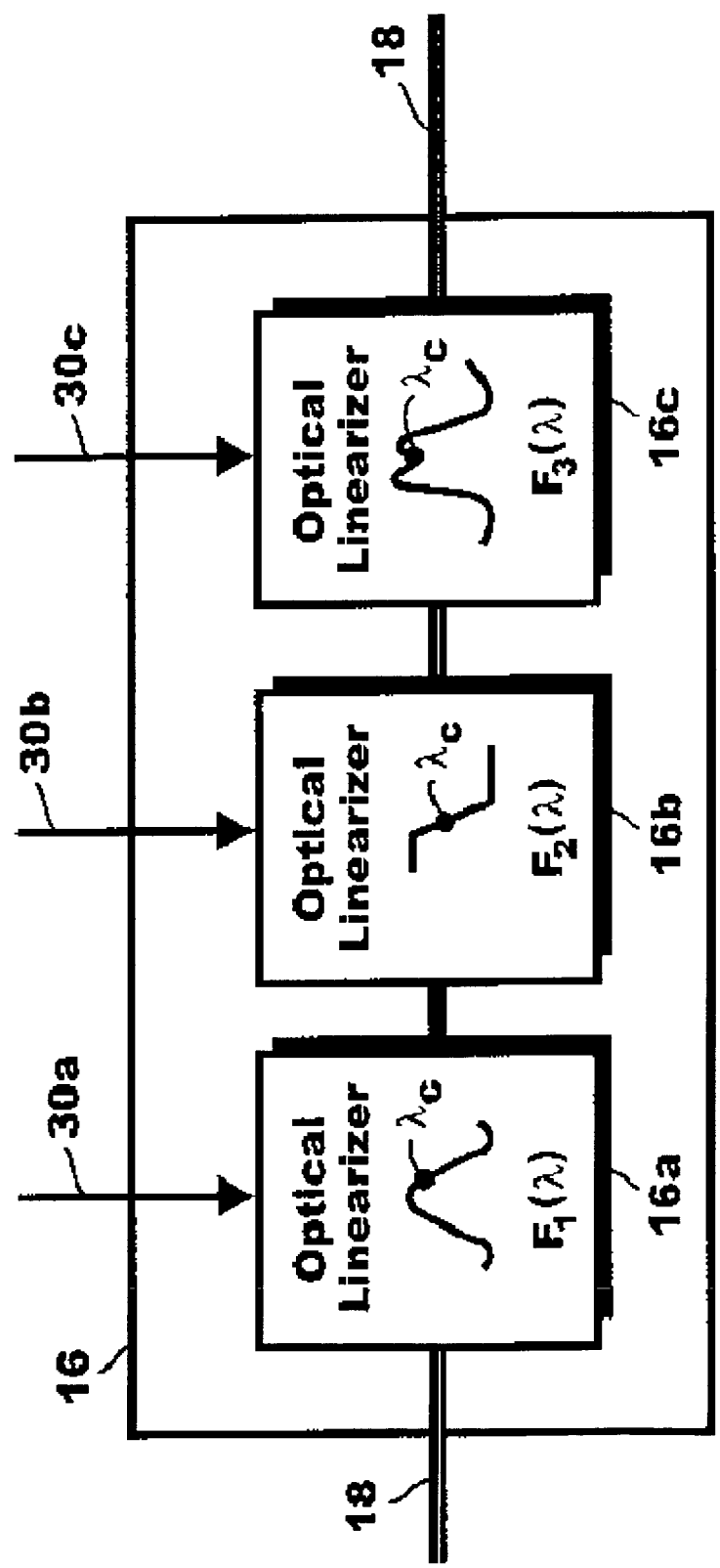
FIG. 11 illustrates various exemplary optical transfer curves $F(\lambda)$ that can be incorporated in an optical linearizer in accordance with the present invention.

FIG. 11 shows that an optical linearizer 16 may include two or more optical linearizing elements in series with different optical transmission characteristics. Referring back to FIG. 1, communications data is generated by a signal source 140 and is used to modulate the optical transmitter 110. The communications data from signal source 140 may be in a digital, an analog, or a mixed format. The modulated signal of the output of optical transmitter 110 is then fed into the optical linearizer 120. For purposes of the present invention, the optical transmitter 110 may include a laser diode such as a DFB laser diode. It is to be appreciated, however, that the optical transmitter 110 may be a direct modulated laser diode, an electro-absorption modulator, or a Mach-Zehnder modulator. Importantly, the output of the optical transmitter 110 at $\lambda_c$ may have an analog modulation format that is sinusoidal in nature. It is also important to recognize that, in all cases, the output of the optical transmitter 110 will include more than just the modulated signal to be transmitted. Specifically, in addition to the modulated signal, the output of optical transmitter 110 generally includes optical distortions (second and/or third order) and it can have a "chirping" ($d\lambda_c$) that is characteristic of the optical transmitter 110. Referring to FIG. 2, the laser control 114 may include a bias control 114A which can be used to influence the content of the output from the optical transmitter 110 (e.g. minimizing the third order distortions). The laser control 114 may also include a wavelength control 114B to establish or tune the center emission wavelength ($\lambda_c$) The wavelength control 114B can be tuned in several ways, such as by temperature tuning, voltage tuning, current tuning or mechanical tuning.

The optical linearizer 120 may be a fused fiber WDM coupler, or, alternatively, be any optical device with a wavelength dependent transfer function. Such a device may include wavelength dependent absorptive (or gain) materials, electro-absorption semiconductor waveguides, fiber Bragg-gratings, wavelength dependent coupling interleavers, Mach-Zehnder waveguide modulators, acoustic-optical tunable filters, tapered fiber filters, thin film filters or arrayed waveguide grating (AWG) filters. These types of devices may be used either individually or in combination with each other to form the linearizer 120. The optical linearizer 120 may be designed and fabricated to have a specific optical transfer curve $F(\lambda)$. Because the optical linearizer 120 is a wavelength dependent device, it can be tuned by the operation control 115.

FIG. 11 also shows various types of exemplary optical transfer curves that can be fabricated for the optical linearizer 120. Specifically, the optical linearizers 16a, 16b and 16c are shown with respective optical transfer curves $F_1(\lambda)$, $F_2(\lambda)$ and $F_3(\lambda)$ that may be controlled (tuned) by respective operation controls 30a, 30b and 30c. It is to be appreciated that the optical linearizers 16a, 16b and 16c are only exemplary, and that they may be used either individually or collectively depending on the specific requirements of the application. Further, these linearizers 16a, 16b and 16c may all operate substantially in the same way. The functionality of the linearizers 16a, 16b and 16c, and their interaction with the optical transmitter 12 will, perhaps, be best appreciated with reference to FIG. 12.

Figure 12:
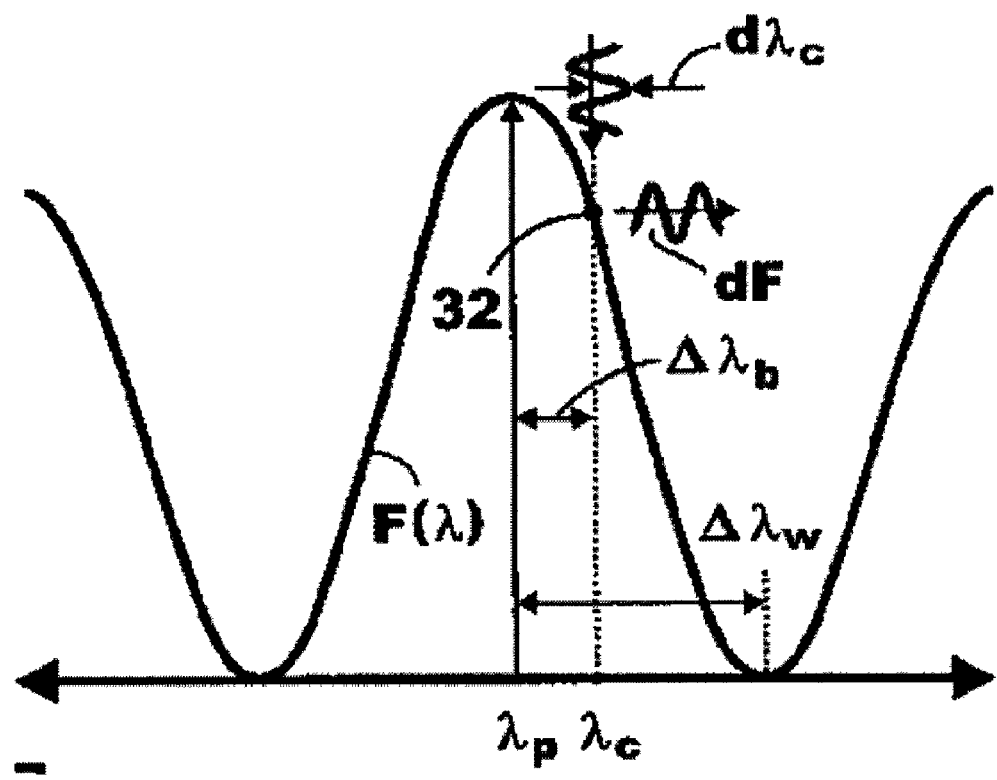
FIG. 12 is an optical transfer curve $F(\lambda)$ showing a chirped wavelength input ($\delta\lambda_c$) interacting with the optical transfer curve $F(\lambda)$ to create modulations ($\delta F$) to induce compensation distortions that are useful for linearizing the output of an optical transmitter.

FIG. 12 shows an optical transfer curve $F(\lambda)$ that is typical of one that can be fabricated for a fused fiber WDM coupler type optical linearizer 120. The optical transfer curve $F(\lambda)$ is characterized by a reference wavelength ($\lambda_p$) and a slope determinant wavelength spacing ($\Delta\lambda_w$). Also, FIG. 12 shows a typical operating point 32 for the optical linearizer 120 that is identified by the wavelength offset $\Delta\lambda_b$. The slope of the transfer curve changes as the operating point 32 is changed. This, of course, need not always be so (e.g. linearizer 16b in FIG. 11). Nevertheless, for the optical transfer curve $F(\lambda)$ shown in FIG. 12, both the reference wavelength ($\lambda_p$), and a slope determinant wavelength spacing ($\Delta\lambda_w$), can be fabricated for the optical transfer curve $F(\lambda)$. The coupler operating point offset ($\Delta\lambda_b$) can then be established (tuned) on optical transfer curve $F(\lambda)$ by the operation controller 30. Preferably, this is done by temperature tuning.

Figure 13A:
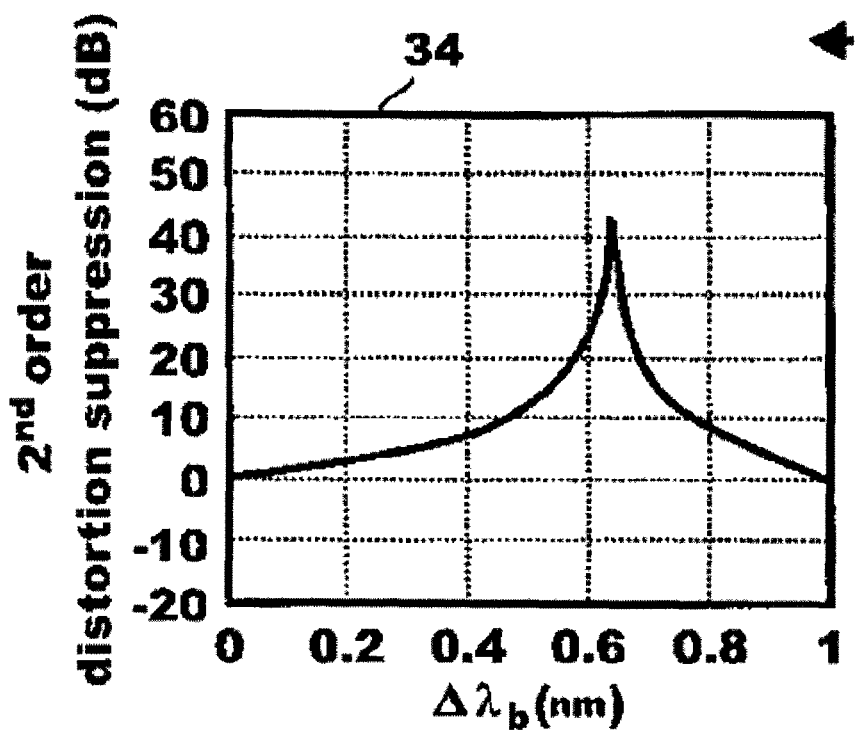
FIG. 13A is a graph showing empirical results for suppression of second order distortions as a function of the operating point wavelength of an optical linearizer.
Figure 13B:
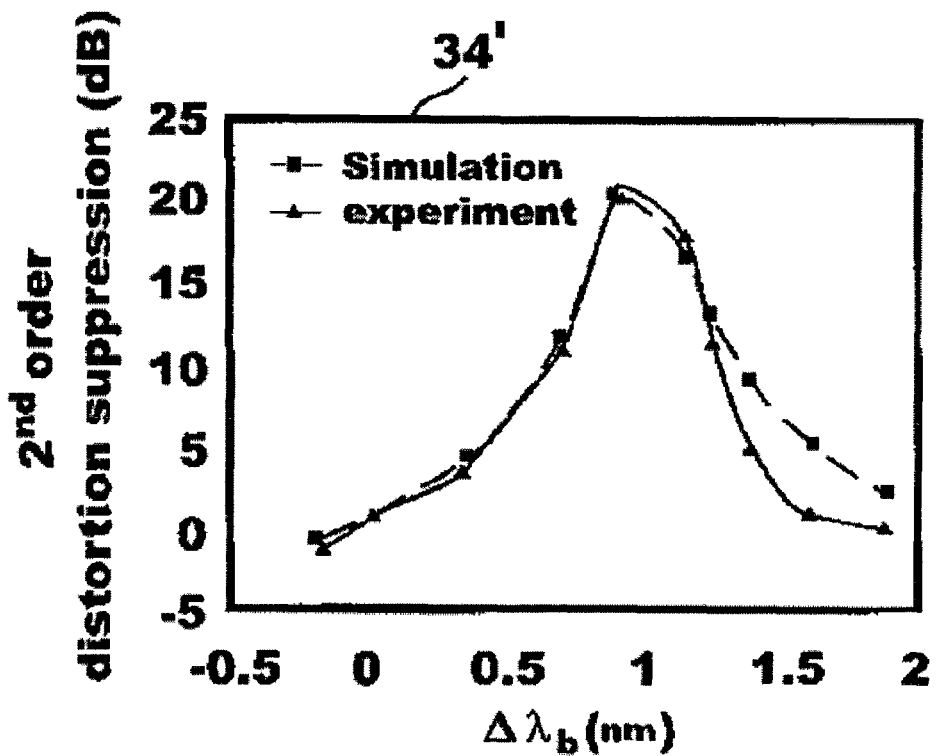
FIG. 13B is a graph showing a comparison between simulation results and experimental data for a specific operating condition of the present invention.
Figure 14:
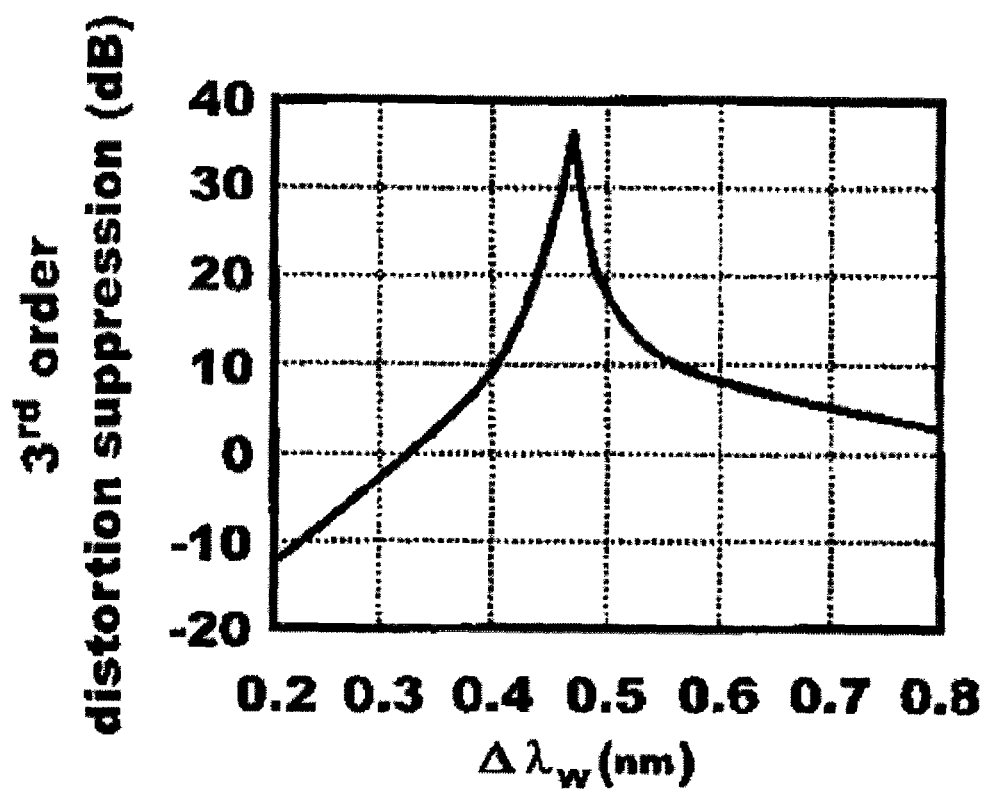
FIG. 14 is a graph showing empirical results for suppression of third order distortions as a function of a slope determinant wavelength spacing of an optical linearizer.

Still referring to FIG. 12, it will be appreciated that the operating point 32 should be established where $\lambda_c = \lambda_p + \Delta\lambda_b$. Accordingly, when the wavelength chirped $d\lambda_c$ from the optical transmitter 12 is fed into the optical linearizer 16, the interaction of the wavelength chirped $d\lambda_c$ at the operating point 32 of the optical transfer curve $F(\lambda)$ results in an output having modulations (dF). FIGS. 13A and 14 respectively show graphs 34, 36 that present empirical data for the suppression of optical distortions in a system 10. Further, FIG. 13B shows a comparison 34' between an empirical simulation and experimental data obtained for a suppression of optical distortions similar to those shown for the graph 34 of FIG. 13A. Specifically, these graphs 34, 36 indicate there is an identifiable operating point wavelength offset ($\Delta\lambda_b$), and an identifiable slope determinant wavelength spacing ($\Delta\lambda_w$) for each optical linearizer 110 that can induce a modulation (dF) which effectively suppresses transmitter distortions (second and/or third order).

Generally, the wavelength dependency of an optical linearizer 16 can be represented by a normalized optical transfer curve $F(\lambda)$. Mathematically, this transfer curve $F(\lambda)$ can be expressed in Taylor series around the center emission wavelength $\lambda_c$ of the transmitter:

$$F(\lambda)=F_0(\lambda_c)+F_1(\lambda-\lambda_c)+F_2(\lambda-\lambda_c)^2/2+F_3(\lambda-\lambda_c)^3/6+\ldots+F_n(\lambda_c)(\lambda-\lambda_c)^n/n!+\ldots \quad (Eq.\ 1)$$

where $F_n = d^n F(\lambda)/d\lambda^n$ with $\lambda=\lambda_c$. Further, the modulated wavelength $\lambda(t)$ (i.e. modulated signal output) of the optical transmitter 110 can be expressed as $\lambda(t)=\lambda_c+d\lambda_c(t)$. For the present invention, in response to the transfer curve $F(\lambda)$, the transmitter chirping $d\lambda c$ creates a modulated linearizer output (dF) shown in FIG. 3. Thus, the output of the optical linearizer 120 can be expressed as:

$$P_{out}(t,\lambda)=P_{TR}(t)\cdot\alpha\cdot F(\lambda) \quad (Eq.\ 2)$$

where $P_{out}$ is the output of the optical linearizer 120, $P_{TR}$ is the output of the transmitter, and $\alpha$ is the optical insertion loss of the optical linearizer 120.

In the specific case where the optical transmitter 110 is a DFB laser diode, the transmitter chirping $d\lambda_c$ under single tone modulation can be expressed as:

$$d\lambda_c(t)=-\eta_{FM}\cdot m\cdot(I_b-I_{th})\cdot\sin(\omega\cdot t)\cdot\lambda_c^2/C \quad (Eq.\ 3)$$

where C is the light speed, $\eta_{FM}$ is the FM response of the laser, $I_b$ is the laser bias current, $I_{th}$ is the laser threshold current, m is the optical modulation depth, and $\omega$ is the modulation angular frequency. Combining Equations (1) to (3), we can obtain the modulated linearizer output from $P(\lambda)$ due to laser chirping as:

$$P_{out}(t,\lambda)=P_{TR}(t)\cdot\alpha\cdot\{F_0(\lambda_c)+F_1\cdot(\lambda_m\cdot\sin(\omega\cdot t))+F_2\cdot(\lambda_m\cdot\sin(\omega\cdot t))^2/2+F_3\cdot(\lambda_m\cdot\sin(\omega\cdot t))^3/6+\ldots\} \quad (Eq.\ 4)$$

where $\lambda_m=-\eta_{FM}\cdot i_b\cdot(\lambda_c)^2/C$ and $i_b=m\cdot(I_b-I_{th})$.

When the optical transmitter is a laser diode the output $P_{TR}$ can be modeled from the laser diode's nonlinear L-I curve, using a Taylor expansion as:

$$P_{TR}(I)=P_{LD}(I_b)+h1\cdot(I-I_b)+h2\cdot(I-I_b)^2/2!+h3\cdot(I-I_b)^3/3!+\ldots \quad (Eq.\ 5)$$

where $hn=(d^n P_{LD}(I)/dI^n)$ at $I=I_b$, and I is the laser diode driving current. Let $I=I_b+m\cdot(I_b-I_{th})\cdot\sin(\omega\cdot t)$ and $i_b=m\cdot(I_b-I_{th})$, then the modulated laser diode output is $$P_{TR}(t)=P_{LD}(I_b)+h1\cdot(i_b\cdot\sin(\omega\cdot t))+h2\cdot(i_b\cdot\sin(\omega\cdot t))^2/2+h3\cdot(i_b\cdot\sin(\omega\cdot t))^3/6+\ldots \quad (Eq.\ 6)$$

Combining Equations (4) and (6), we can derive the second and third order compensation distortion contents after the output of the optical linearizer 110 as:

$$P_{out,2nd}\approx\alpha\cdot i_b^2\cdot\cos(2\cdot\omega\cdot t)\cdot\{h2[F_C(\lambda_c)+F_2\cdot(\eta_{FM}\lambda_c^2/C)^2\cdot i_b^2/2]/4$$

$$+h1\cdot F_1\cdot(\eta_{FM}\lambda_c^2/C)/2+h1\cdot F_3\cdot(\eta_{FM}\lambda_c^2/C)^3\cdot i_b^2/12$$

$$+h3\cdot F_1\cdot(\eta_{FM}\lambda_c^2/C)\cdot i_b^2/12+5\cdot h3\cdot F_3\cdot(\eta_{FM}\lambda_c^2/C)^3\cdot i_b^4/192$$

$$-P_{LD}(I_b)\cdot F_2\cdot(\eta_{FM}\lambda_c^2/C)^2/4\} \quad (Eq.\ 7)$$

and $$P_{out,3rd}\approx\alpha\cdot i_b^3\cdot\sin(3\cdot\omega\cdot t)\cdot\{-h3/24\cdot[F_0(\lambda_c)+F_2\cdot(\eta_{FM}\lambda_c^2/C)^2\cdot i_b^2/4]$$

$$+h2/8\cdot[F_1\cdot(\eta_{FM}\lambda_c^2/C)+F_3\cdot(\eta_{FM}\lambda_c^2/C)^3\cdot i_b^2/8]$$

$$-[h1+h3\cdot i_b^2/8]\cdot F_2\cdot(\eta_{FM}\lambda_c^2/C)^2/8$$

$$+[P_{LD}(I_b)+h2\cdot i_b^2/4]\cdot F_3\cdot(\eta_{FM}\lambda_c^2/C)^3/24\}. \quad (Eq.\ 8)$$

The second order distortion terms in Equation (6) primarily consist of a combination of the second order distortion $P_{out,2nd,LD}$ originated from the laser diode transmitter, second order distortion $P_{out,2nd,LD(x) \text{ linearizer}}$ due to the mixing of the first order laser output with the first order chirping-modulated linearizer output, and the second order chirping-modulated linearizer output $P_{out,2nd,linearizer}$. According to Equation (7) with proper $\lambda_c$ and optical linearizer function $F(\lambda)$, the second order distortion $P_{out,2nd,LD}$ can be suppressed or compensated primarily by $P_{out,2nd,LD(x) \text{ linearizer}}$ and $P_{out,2nd,linearizer}$. Similarly, the third order distortion can be suppressed by proper $\lambda_c$ and $F(\lambda)$.

The generality of this approach can be demonstrated using a few illustrative examples. For an optical linearizer with linear wavelength attenuation relationship, such as the linearizer 16b shown in FIG. 11, i.e., $F_{n \geq 2} = 0$, the second order distortion can be suppressed if $F_1 = h2 \cdot F_0(\lambda_c) \cdot C/(2 \cdot h1 \cdot \eta_{FM} \cdot \lambda_c^2)$ and the third order distortion can be suppressed if $F_1 = h3 \cdot F_0(\lambda_c) \cdot C/(3h2 \cdot \eta_{FM} \cdot \lambda_c^2)$ where $F_1$ is the slope of the normalized transfer curve at $\lambda_c$. For an optical linearizer using fused fiber WDM coupler with an optical transfer curve $F(\lambda)$ as shown in FIG. 12, this transfer function $F(\lambda)$ can be expressed as:

$$F(\lambda) = [1 + \cos(\pi \cdot (\Delta\lambda_b + d\lambda)/\Delta\lambda_w)]/2 \quad \text{(Eq. 9)}$$

where $\Delta\lambda_w$ is the fused fiber WDM coupler slope determinant wavelength spacing (i.e. the WDM coupler channel spacing), $d\lambda_c$ is the wavelength chirping of the optical transmitter 12, and $\Delta\lambda_b$ is the coupler operating point offset. According to FIG. 12, we have $\Delta\lambda_b = \lambda_c - \lambda_p$ where $\lambda_p$ is the reference wavelength of the coupler. Using Equations (3), (7), (8) and (9), the second and third order distortions can be approximated as:

$$P_{out,2nd} \approx \alpha \cdot i_b^2 \cdot \cos(2 \cdot \omega \cdot t) \cdot \{-h2 \cdot [1 + \cos(\pi \cdot \Delta\lambda_b/\Delta\lambda_w)]/8$$

$$-h1 \cdot \sin(\pi \cdot \Delta\lambda_b/\Delta\lambda_w) \cdot (\pi/2) \cdot (\lambda_c/C) \cdot (\eta_{FM}/\Delta\lambda_w)/2$$

$$+P_{LD}(I_b) \cdot \cos(\pi \cdot \Delta\lambda_b/\Delta\lambda_w) \cdot [\pi \cdot (\lambda_c^2/C) \cdot \rho_{FM}/\Delta\lambda_w]^2/8\} \quad \text{(Eq. 10)}$$

$$P_{out,3rd} \approx \alpha \cdot i_b^3 \cdot \sin(3 \cdot \omega \cdot t)/2 \cdot \{-h3/24 [1 + \cos(\pi \cdot \Delta\lambda_b/\Delta\lambda_w)]$$

$$-h2/4 \cdot \sin(\pi \cdot \Delta\lambda_b/\Delta\lambda_w) \cdot (\pi/2) \cdot (\lambda_c^2/C) \cdot (\eta_{FM}/\Delta\lambda_w)$$

$$+h1 \cdot \cos(\pi \cdot \Delta\lambda_b/\Delta\lambda_w) \cdot [\pi \cdot (\lambda_c^2/C) \cdot \eta_{FM}/\Delta\lambda_w]^2/8$$

$$+P_{LD}(I_b) \cdot \sin(\pi \cdot \Delta\lambda_b/\Delta\lambda_w) \cdot [\pi \cdot (\lambda_c^2/C) \cdot \eta_{FM}/\Delta\lambda_w]^3/24\}. \quad \text{(Eq. 11)}$$

In light of the above, compensation distortion suppressions with a fused fiber WDM coupler can be examined using laser diode parameters where $h1 \approx 0.36$ mW/mA, $h2 \approx 1.5 \cdot 10^{-4}$ mW/mA$^2$, and $h3 \approx 4 \cdot 10^{-6}$ mW/mA$^3$. Assuming $I_b - I_{th} = 60$ mA, m=13%, $\lambda_c = 1310$ nm, $\eta_{FM} = 100$ MHz/mA, optical losses of 4.6 dB, laser output power of 22 mW, 0.85 mA/mW detector responsivity, no additional distortions after fiber transmission/detection and no distortion compensation from the optical linearizer 16, the detected fundamental signal is −18 dBm, the second order harmonic is −79 dBm, and the third order harmonic is −103 dBm. The above distortions all originate from the optical transmitter 110. With optical linearizer parameters $\Delta\lambda_w = 3$ nm and $\Delta\lambda_b = 0.65$ nm, the detected fundamental signal is −19 dBm, the second order harmonics is −120 dBm, and the third order harmonics is −104 dBm. The second order distortion is suppressed by 40 dB after optical compensation, with an additional optical loss of 0.5 dB due to coupler offset from the coupler maximum transmission point. With $\Delta\lambda_w = 3$ nm, FIGS. 13A and 13B show the second order suppression as a function of $\Delta\lambda_b$. According to FIGS. 13A and 13B, a compensation suppression of more than 20 dB can be achieved when $\Delta\lambda_b$ various from 0.6 to 0.7 nm. With optical linearizer 120 having $\Delta\lambda_w = 0.47$ nm and no offset ($\Delta\lambda_b = 0$ nm), the detected fundamental signal is −18 dBm, the second order harmonics is −77 dBm, and the third order harmonics is −140 dBm. The third order distortion is suppressed by 37 dB after optical compensation. With $\Delta\lambda_b = 0$ nm, FIG. 14 shows the third order suppression as a function of $\Delta\lambda_w$. According to FIG. 14, a compensation suppression more than 20 dB can be achieved when $\Delta\lambda_w$ varies from 0.45 to 0.49 nm. It is also possible that with a single optical linearizer 120, we can simultaneously suppress both second and third order distortions. A simulation with the optical linearizer $\Delta\lambda_w = 0.45$ nm and $\Delta\lambda_b = 0.02$ nm yields a detected fundamental signal of −18 dBm, the second order distortions of −107 dBm, and the third order distortions of −123 dBm. In this case, 20 dB or more suppression is simultaneously obtained for both second and third order distortion. To confirm the theory, FIG. 13B is included to show the second order distortion suppression obtained by empirical simulation in comparison with experimental data where $h1 \sim 0.15$ mW/mA, $h2 = -0.7 \times 10^{-4}$ mW/mA$^2$, $\lambda_c = 1313$ nm, $\eta_{FM} = 270$ MHz/mA, and $\Delta\lambda_w = 5.5$ nm.

In the specific case where the optical linearizer 120 is a fused fiber WDM coupler, it can be appreciated with reference to from FIGS. 12, 13A and 13B, that $\lambda_c$ needs to be aligned to $\lambda_p + \Delta\lambda_b$ with certain degree of accuracy to achieve good compensation distortion suppression. Given a specified operation condition for the optical transmitter 110, $\Delta\lambda_w$, and $\Delta\lambda_b$ can be estimated for optimum performance. Knowing $\lambda_c$, a fused fiber WDM coupler can be fabricated with a reference wavelength $\lambda_p = \lambda_c - \Delta\lambda_b$ and the desired slope determinant wavelength spacing $\Delta\lambda_w$. The small offset between $\lambda_c$ and $\lambda_p + \Delta\lambda_b$ can then be minimized by temperature tuning the laser diode (optical transmitter 110) and/or the fused fiber WDM coupler (optical linearizer 120). If the optical linearizer is a fused fiber WDM coupler, the temperature sensitivity of the coupler (optical linearizer 120) may be around 0.01 nm/° C. and the sensitivity of the DFB laser diode (optical transmitter 110) may be around 0.1 nm/° C. The stability of a good laser diode temperature controller can be better than 0.1° C., which corresponds to wavelength stability on the order between 0.01 to 0.001 nm.

The following describes a specific implementation of a fused fiber optical linearizer suitable for the above and other applications. In general, both fused and tapered optical fibers may be used. The fused fiber filter may be fabricated by first stripping the buffer material from two optical fibers over a small distance (typically less than 20 mm). These fibers are cleaned and placed side by side in a clamping mechanism attached to a multi-axis motion control stage. Next, the stripped regions of the two fibers are brought into contact. This may be done either by manually pushing the fibers together or by twisting the fibers around each other. Once the fibers are in place, a heat source, such as a gas flame microtorch, may be positioned to allow heating of a small section of the fibers to a temperature which will allow them to fuse to each other. This heat source may be allowed to move during fabrication to change the size of the heated region, as well as change in intensity to increase or lower the temperature of the fiber during various stages of the process. Once the heat source is applied, there may be an initial period when the fibers are kept stationary to allow them to fuse a predetermined amount before pulling. The clamps holding the optical fibers may be subsequently set in motion in such a manner as to begin stretching the fibers to form a taper in the heated region. The rate of this tapering may be constant, or it may change to allow precise control over the taper profile. It is typical to pull at a high rate initially to allow for short fabrication times, and then slow near the end of the process to allow better control of the final stopping point.

During the process of creating a fused fiber filter, substantially unpolarized light is input into one of two fibers that are fused together and tapered, and the output power of each fiber is monitored as the coupler is elongated. The injection of either unpolarized light or light that has roughly equal amounts of power polarized in both the principal axes of the fused fibers is beneficial, in that it allows one to view the effects of form birefringence (the polarization effects caused by the non-circular cross-section of the fused region) on the coupling properties. As the fused fibers are pulled and tapered, both the degree of fusion, which affects the coupling coefficient, and the coupling length are gradually increased. It is observed that initially no power is transferred from the input fiber to the other. As the pulling continues light begins to couple over from one fiber into the second fiber. During tapering light initially launched into one of the fibers detaches from the core and becomes guided by the cladding/air interface. Low loss tapers will excite the two lowest order modes of the composite waveguide formed in the tapered region of the two fibers. Since the propagation constants are different for these two modes, there will be a beating of the modes as they propagate down the fused region of the coupler, resulting in a transfer of power from one output fiber to the other, which causes the optical power to cycle sinusoidally between the two output ports if the pulling of the fibers is continued. Due to the fact that different wavelengths of light will have different propagation constants, and thus different coupling rates, at any given stage in the pulling process the power ratio in the two output ports will be different for different wavelengths input to the device. Thus the fused fibers may operate as a wavelength filter, which ends up having a sinusoidally varying transfer curve as a function of wavelength. This sinusoidal wavelength dependence will have an increasing frequency, and thus a steeper maximum slope, as the device is pulled through longer lengths.

If the coupler is drawn to sufficient lengths, form birefringence in the coupled region results in an additional sinusoidal envelope modulating this power transfer, due to the fact that the coupling coefficients for light aligned along each of the principal axes of the tapered waveguide are slightly different. This effect is only seen when the fibers have been pulled for relatively long lengths, and thus through many power transfer cycles. This envelope is an indication of the polarization dependence of the device. A polarization insensitive fused fiber filter can be created by monitoring the polarization envelope and halting the tapering when the coupling is observed to be at a maximum in the polarization envelope. The required slope of the filter can be determined by selecting which envelope maximum (eg first, fifth, tenth, etc.) at which the process is stopped. In addition, the fabrication parameters can be varied to allow for slightly different filter characteristics within a given envelope. After stopping the pulling and removing the heat source, the device may be tuned by slight changes in the tensioning of the fused fibers. This is most reliably accomplished by inserting a broadband light source into the input fiber and connecting one of the output fibers to an optical spectrum analyzer to monitor the wavelength response. The device is then tuned to properly align the peak channel wavelength with the polarization envelope. Proper alignment may include shifting the peak response of the filter to occur at a position different from the polarization envelope maximum in order for the expected operating wavelength (which typically will not be at the filter's peak wavelength) to be aligned as closely as possibly with the polarization envelope maximum, ensuring a high degree of polarization insensitivity.

TABLE 4

| Specifications/Requirements: | |
| --- | --- |
| Fiber Type | SMF28 |
| Equivalent Channel Spacing | 4.5-5.0 nm |
| Excess Loss | ≦0.2 dB |
| Wavelength Range | 1305-1315 nm |
| Peak Wavelength Stability | ±0.10 nm (lifetime) |
| Operating Temperature | −20 C.-+65 C. |
| Storage Temperature | −40 C.-+85 C. |
| Operating/Storage Humidity | 5-85% |
| Temperature Response | ≦0.0075 nm/C (linear) |
| Temperature Slope Variation Between Units | ≦±5% |
| Packaged Size | ⅛" × 2.5" (maximum) |
| Peak Wavelength Isolation* | 27 dB min-30 dB max |
| Polarization Envelope Width | ≧100 nm |

After tuning, the device is then packaged by mounting the filter to a glass substrate (typically using epoxy). Once the coupler has been bonded to the supporting substrate, the substrate is then placed inside a steel tube, and the ends of the tube are sealed. Table 4 shows an example of such a fused fiber linearizer produced with the above fabrication techniques.

Only a few embodiments are disclosed. However, it is understood that variations and enhancements may be made without departing from the spirit of and are intended to be encompassed by the following claims.

What is claimed is:

1. A system comprising:
    an optical transmitter to produce an optical signal in response to a control signal that is modulated to carry information;
    an electrical pre-distortion circuit, coupled in an electrical path of said control signal prior to reception by said optical transmitter, to superimpose an electrical pre-distortion signal to said control signal that reduces nonlinear distortions in said optical signal;
    an optical device disposed in an optical path of said optical signal and configured to produce a wavelength-dependent optical transfer profile on said optical signal to reduce residual nonlinear distortions in said optical signal and to produce a linearized optical signal;
    an optical coupler disposed in said optical path to split a fraction of said linearized optical signal to produce an optical monitor signal;
    an optical detector coupled to receive said optical monitor signal to produce a detector output;
    a distortion circuit coupled to said optical detector to receive said detector output, said distortion circuit to measure nonlinear distortions in said linearized optical signal and to produce a distortion control signal to control at least one of said optical transmitter and said optical device to further reduce nonlinear distortions in said linearized optical signal; and
    a wavelength control unit coupled to said optical transmitter that controls a wavelength of said optical signal, wherein said distortion control signal is coupled into said wavelength control unit to adjust said wavelength of said optical signal.

2. The system as in claim 1, further comprising a bias control unit coupled to said optical transmitter that produces an electrical bias to said optical transmitter that affects said optical signal, wherein said distortion control signal is coupled into said bias control unit to adjust said electrical bias.

3. The system as in claim 1, wherein said optical device is configured to optically respond to said distortion control signal to modify said wavelength-dependent optical transfer profile on said optical signal to reduce residual nonlinear distortions in said linearized optical signal.

4. The system as in claim 1, further comprising a pre-distortion control coupled between said distortion circuit and said pre-distortion circuit to receive an output from said distortion circuit to control said electrical pre-distortion signal from said pre-distortion circuit.

5. The system as in claim 4, wherein said distortion circuit measures at least one of a second order nonlinear distortion signal and a third order nonlinear distortion signal.

* * * * *